(12) United States Patent
Miller

(10) Patent No.: US 12,282,432 B2
(45) Date of Patent: Apr. 22, 2025

(54) GRAPH MEMORY ENGINE

(71) Applicant: Intel Corporation, Santa Clara, CA (US)

(72) Inventor: Michael J Miller, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 383 days.

(21) Appl. No.: 17/378,647

(22) Filed: Jul. 16, 2021

(65) Prior Publication Data

US 2022/0114103 A1 Apr. 14, 2022

Related U.S. Application Data

(63) Continuation of application No. PCT/US2020/048853, filed on Aug. 31, 2020.

(60) Provisional application No. 62/894,454, filed on Aug. 30, 2019.

(51) Int. Cl.
*G06F 12/0875* (2016.01)

(52) U.S. Cl.
CPC .... *G06F 12/0875* (2013.01); *G06F 2212/452* (2013.01)

(58) Field of Classification Search
CPC .................. G06F 12/0875; G06F 2212/452
See application file for complete search history.

(56) References Cited

U.S. PATENT DOCUMENTS

| 5,867,649 A * | 2/1999 | Larson | G06F 8/314 |
| | | | 709/201 |
| 5,963,972 A * | 10/1999 | Calder | G06F 12/0875 |
| | | | 711/158 |
| 2006/0277391 A1 * | 12/2006 | Bittner | G06F 9/4494 |
| | | | 712/201 |
| 2007/0011436 A1 | 1/2007 | Bittner | |
| 2007/0282573 A1 * | 12/2007 | Fritz | G06F 9/4498 |
| | | | 703/2 |
| 2013/0205286 A1 * | 8/2013 | Barraclough | G06F 11/3612 |
| | | | 717/151 |
| 2014/0019949 A1 * | 1/2014 | Craymer | G06F 8/452 |
| | | | 717/150 |
| 2014/0310302 A1 * | 10/2014 | Wu | G06F 16/245 |
| | | | 707/769 |
| 2014/0369363 A1 * | 12/2014 | Hutchison | H04L 45/745 |
| | | | 370/474 |

(Continued)

OTHER PUBLICATIONS

International Search Report ("ISR") and Written Opinion ("WO") from ISA/US for PCT/US2020/048853, ISR/WO mail date Dec. 18, 2020, 12 pages.

*Primary Examiner* — Francisco A Grullon
(74) *Attorney, Agent, or Firm* — Compass IP Law PC

(57) ABSTRACT

A system, method, and apparatus for graph memory. In one embodiment, the method includes: traversing program instructions disposed in an associative memory for operating a computer, the method comprising: receiving input data to be processed; identifying a next instruction to be fetched in the memory for processing the input data via: receiving a current node ID of a current state; performing a computational test on the input data resulting in a computed value; generating a search key by combining at least a portion of the computed edge value with the current node ID; and accessing the next instruction in associative memory via the search key.

30 Claims, 12 Drawing Sheets

(56) References Cited

U.S. PATENT DOCUMENTS

| | | | |
|---|---|---|---|
| 2016/0299991 A1 | 10/2016 | Hong et al. | |
| 2017/0004413 A1* | 1/2017 | Flores | G06F 16/2365 |
| 2017/0139756 A1* | 5/2017 | Starikov | G06F 9/522 |
| 2018/0232404 A1* | 8/2018 | Bhatti | G06F 16/9024 |
| 2018/0365289 A1* | 12/2018 | Brown | G06F 16/24535 |
| 2018/0367557 A1 | 12/2018 | Brown et al. | |
| 2019/0042662 A1 | 2/2019 | Cohen et al. | |
| 2019/0095442 A1* | 3/2019 | Fischetti | G06F 16/2255 |
| 2019/0205792 A1* | 7/2019 | Huang | G06F 9/4881 |
| 2019/0317940 A1* | 10/2019 | Bauer | G06F 16/24561 |

\* cited by examiner

GRAPH MEMORY ENGINE

CROSS-REFERENCE TO RELATED APPLICATIONS

This application is a continuation of, and claims priority to: PCT International Application No. PCT/US2020/048853, titled "Graph Memory Engine", by Michael J. Miller, having an international filing date of Aug. 30, 2020; and claims priority to provisional application(s): Ser. No. 62894454, by Michael J. Miller, filed Aug. 30, 2019, titled "Graph Memory Engine"; the disclosures of all of said applications are incorporated by reference herein in their entirety. Furthermore, where a definition or use of a term in a reference, which is incorporated by reference herein, is inconsistent or contrary to the definition of that term provided herein, the definition of that term provided herein applies and the definition of that term in the reference does not apply.

FIELD OF TECHNOLOGY

This disclosure relates generally to the technical fields of integrated circuits, software, and graph database, and in one example embodiment, this disclosure relates to a method, apparatus and system of storing and retrieving graphs in memory.

BACKGROUND

Classifying and filtering data (digital data or machine instructions, aka software code), for data processing or for controlling the operation of machines or business processes, can be performed with automata expressed as a 'graph' in the classic sense of data and computer science (referred to herein simply as a 'data graph'). In this sense, a data graph is a structure with a set of objects wherein some pairs of the objects are 'related' to each other in some sense. That is, the objects correspond to mathematical abstractions called 'vertices' (aka nodes or points) and each of the related pairs of vertices is called an edge (aka a link or a line). Typically, a data graph is depicted in diagrammatic form as a set of dots or circles for the vertices, joined by lines or curves for the edges. Those skilled in the art use data graphs as a well-known data structure that represents associated relationships in a variety of applications, such as data science, machine learning, social networks, roadmapping, routing package delivery, agribusiness, modeling of molecules in chemistry and physics, genomics, etc.

A data graph in this classical sense of computer science, as used herein, is different from a Cartesian (or polar) coordinate system graph. The Cartesian coordinate system represents geometric shapes (such as curves or lines) in terms of Cartesian equations, and represents algebraic equations (linear, polynomials, etc.) involving the coordinates of the points lying on the shape using a two-dimensional X-axis and Y-axis graph or a three-dimensional graph that adds a Z-axis. This type of geometric graph is not directly related to the present disclosure.

The classic data graph expressed by 'automata' (plural of automaton) is defined as a machine or control mechanism design to automatically follow a predetermined sequence of operations or to respond to encoded instructions. In one example, a machine can perform classification and filtering of data or a control mechanism designed to follow a predetermined sequence of operations automatically or to respond to encoded instructions. Automata theory is expressed in various applications such as a Turing machine, a pushdown automaton, a finite-state machine (FSM) (aka a finite automaton), and most specifically, as a combinational logic in an electrical semiconductor circuit. An FSM is defined as an abstract machine that can be in exactly one of a finite number of states at any given time. While the theory of a FSM may be 'abstract' to some, the implementation of the FSM is not abstract when considering embodiments of i) hardware, ii) electrical circuits, and iii) software executed on a physical controller or logic circuits in order to operate the physical controller and logic circuits as a machine, usually in a more efficient way that reduces latency, power use, or other performance criteria. Those three exemplary embodiments are very physical things that are not abstract. Hence, improvements to classic data graph operation, systems, and method of operation have real world impacts on physical machines.

As a simple example, a classic model of a state machine can be a passenger turnstile on a metro subway. The steps, or states, of the turnstile begin with a locked state preventing passengers from passing therethrough. Another state occurs when a coin or token is deposited in the turnstile thereby unlocking the turnstile and allowing a (single) passenger to turn the turnstile and pass through. After the pass through, the turnstile returns to its original, locked state. The storage, execution, and update of the steps or states for the automaton are a significant portion of operating the automaton with low latency, with consistency, with efficiency of resources, and without bugs or contradictions.

The turnstile state machine can be represented by a directed graph called a state diagram (a picture of vertices, or circles, and paths, or lines connecting the circles). The turnstile state machine can also be represented by a state transition table, showing the transitions between each possible state, (based upon the inputs to the machine) and the outputs resulting from each of the inputs). However, the result is still an electrical and/or mechanical device that implements the steps and operations of the turnstile such that the states are satisfied (e.g., the turnstile machine does not permit a rotation of the turnstile for more than one passenger at a time for a given coin or token). If the turnstile is sophisticated, it can implement a more complicated state diagram that allows, for example, a repetition of turning the turnstile, e.g., in the case of an emergency, or a onetime payment for a multi-turn execution of the turnstile for multiple passengers, etc. The storage, execution, and manipulation of the states and instructions, which involve hardware such as memory, are executed by a controller, to operate a physical device, such as a turnstile machine.

A graph of the few states for an ordinary turnstile appears to be a straightforward exercise to store in memory. However, if an application involves tens, hundreds, or more of different states, then implementing that graph in memory raises memory management challenges in updating, executing, and managing the states. The challenges include memory allocation, so-called garbage collection, so-called heap management, and more.

For example, implementing a graph node (for a given state) can be accomplished using a lookup table (LUT) or a list, but each implementation has drawbacks. A LUT grows exponentially with the number of bits in the key (e.g., $2^n$ table for an 'n' bit wide key). This is true even if only a portion of the LUT is used, because the entire table space has to be reserved in memory. A LUT is a simple array with an indexing operation to find the desired cell. A LUT population is typically limited to only the given edges of a given node, in order to limit latency and updating. The associated data in a LUT is usually a pointer function, or label offset, to an address for the proper vertex to which the operation proceeds.

Alternatively, a list can be used instead of a table for traversing vertices. A list can handle large keys, but if there are many edges (or paths) leaving a graph node, then the processing time can grow in order to compare all the keys against the possible edges to find the correct one. The result is an increase in latency, which is a sensitive performance metric in many applications.

Graph implementations, in general, are static and difficult to update dynamically, e.g., on the "fly". An update can often require multiple cycles during which time access to the entire memory is "locked out" in order to maintain coherency between a source (a host machine) and destination (a servant machine to the host) for the updated data.

Graph implementations also usually only have one mechanism for traversing edges of the graph. That is, implementations of a graph usually choose edges based upon a certain value. This can limit the flexibility, intelligence, and range of applications of the graph implementation.

Finally, graphs usually produce only one type of result, which is the 'location' information of reaching a certain point, i.e., a vertex. There is no additional data associated with the result. The result can simply be thought of as a pointer to an address containing data.

Dedicated hardware solutions, aka graph processing accelerators ("GPAs"), can provide significant benefits over pure software solutions for graph processing systems in terms of performance and energy efficiency. Nevertheless, tradeoffs exist in the diverse characteristics of graph processing and complexity of hardware configurations.

Additional information on data graphs is available in the publication by Gui C Y, Zheng L, He B S et al., titled "A survey on graph processing accelerators: Challenges and opportunities", Journal of Computer Science and Technology, arXiv:1902.10130v1 [cs.DC], 26 Feb. 2019, which is hereby incorporated by reference in its entirety.

Independent of a data graph is a computational science of processors and memory operation. A computer program for traversing a graph is typically executed by a processor and memory that is independent of, and separate from, the graph itself. Instruction code and data for graph vertices is stored in memory or a storage device and is executed by a controller or processor in i) a dedicated computer, programmable logic controller (PLC), server, mainframe, etc.; or ii) any type of non-computing device or apparatus, which is enhanced with processing elements, e.g., Internet of Things (IoT) devices, etc.

Typically, instruction code or data is retrieved from memory or storage using a pointer system to locate a memory cell address containing a desired code or data. Data or code can also be stored in local instruction or data cache that are close to the processor for low latency access, with data or code being accessed in a stack using a pointer system to an address. Future instruction code is prefetched from memory or storage before it is actually needed by the processor in order to reduce latency.

However, for conditional instruction code, which is dependent on an output or some external result, a fork exists for multiple possible paths of instruction code. Predicting and prefetching a correct branch can be efficient if guessed correctly. However, a failure to correctly predict and prefetch the correct branch can result in a time-consuming system interrupt and a wait while a correct data and/or instruction is accessed. Data input and output from a processor can be accessed in various hierarchical levels of cache or in off-board storage, such as a solid-state drive. This process is typically performed sequentially, though multiple processor cores can be coupled on a board for symmetrical multi-processing (SMP) using the same paradigm. These architectures separate the compute and storage functions and they use pointers to access code and data at a given memory address.

Alternatively, if in-memory processing distributes some of the processor operations within the memory, a central processor is still used in this architecture to direct the portion of processing function that is to be performed in-memory, versus that performed by the processor itself. In addition, pointers are still used for directing where code and data can be accessed.

SUMMARY

An apparatus, method and system are disclosed, for a feature-rich graph memory solution known as a graph memory engine (GME). A GME is implementable as a data graph that is then enhanced with one or more features of: i) associative array (or associative memory) data structure to determine which edge to traverse between nodes in the data graph; ii) addressless and/or pointerless traversing of edges through the data graph via the associative array; iii) multi-factor search key (current node state+edge value (result of computation test)) to determine which edge to traverse to a next node (vertex) in the associative array; iv) high fan-out capability of edges at each node; iv) in-graph coding with co-located program or instruction code associated with the node, or vertex, entry in the associative array; v) data graph nodes have at least one default edge for non-match condition (translates into a default edge of the associative array); vi) multi-range compare options (greater than, equal to, greater than and less than, sequential ordering, etc.) vii) node associated instruction or action in the graph memory associative array (e.g., instruction execution capacity at node (e.g., select bits action from input vector [8,24])); for given node (state) and (calculated 1 value for node) edge value, there is an action (default, bit select, range compare) to be taken; v) (test some input, test some RAM, generate O/P results to some sort of queue send output results, operation execution on incoming or stored data to contribute edge selection)) for a given node to generate a calculation (e.g., a test) used in part to determine, via the associative array, an edge to traverse; and vi) nonessential features include: indexed memory, sequential storage of instructions, prefetch of instruction code, branch prediction and addresses/pointers functions to access instructions and data in memory.

Benefits of the present disclosure of a graph memory engine include, but are not limited to, the following items: i) incremental addition of edges for graph (instructions) without requiring a memory rewrite and without requiring duplicate copies of sub graphs; ii) state coherency of data graph associative array on each clock cycle without "long" (more than two) contiguous multi cycle "lock out" periods; iii) fixed computation time and linear memory storage for large and sparse "branch space" nodes; low management overhead for memory update by host; iv) logical mapping of host interface to associative array constructs in contemporary languages including Python, Java, C#, etc for seamless/consistent integration at a fundamental level, thereby allowing programmers to manage the graph (creating, pruning, balancing, etc), e.g., dictionary method in Python; v) sharable maps of data graph between execution unit and host CPU (for performing dynamic updates on the fly) based on native "coherent" nature of the associative array; vi) single unique edge selection for processing based upon a computed input or a stored data; vii) single instruction "branch" down of a unique edge and an operation on stored state in memory/registers.

In the present disclosure, the data graph of nodes and associated data, which is disposed in associative array, actually becomes the application program itself, e.g., the two being intertwined or coexistent. Because of this relationship and the use of associative array, the GME does not require addresses or pointers to locate data and code in memory to be executed, e.g., for a next graph node. Thus, traversing the GME is addressless and/or pointerless operation. Furthermore, the GME does not require instruction prefetch, branch prediction, system interrupts for cache misses, or cache coherency management. This is due to the fact that a next instruction at a next node in the graph is fetched by starting with a current state "node ID", combining it with the results of a calculation, or computation test, to create a new search key, and then using the search key to access the associative array for a match to the next node, or instruction, in the graph. This process is also termed 'in-graph computing'.

The present disclosure is different from most computation engines, which use indexed memory to store program code and data in a sequential fashion. Data and code in conventional systems are accessed by a pointer system to index into memory addresses to locate desired data and code instructions. This conventional method and architecture can be time and resource intensive, requiring instruction prefetch, branch prediction, system interrupts for cache misses, and cache coherency management between memory and cache.

In contrast, the present disclosure stores "program" or "instructions" discretely in an associative array, e.g., an associative array, as a graph, whose individual nodes can be arranged in any sequence, either wholly or partially sequentially and/or non-sequentially. The location of the individual instructions for the program, which correspond to a given node in the data graph, is irrelevant and nonessential (not required) to be known or tracked. The search of the associative array is used in lieu of discrete addresses to find a next instruction. Either a subset or a superset of all possible instructions can be accessed in the associative array for searching to find a match to a new search key, leading to the next instruction associated with the matching key. Thus, traversing the graph really becomes an execution of a discretely distributed application program without having to compile, interpret, or run a whole computer program independent of a data graph.

Said differently, the operation code of the application program is parsed into portions associated with each node, or state, of the graph, where the graph represents all the states of the application program. The opcode is disposed anywhere in associative array without regard to an address location. Instead the discrete opcode location and its identify is determined by the search key calculated by a prior instruction and a computation test. The program continues to advance through the graph, to the next instruction, or node in this case. Thus, the present disclosure is a paradigm shift that previously treated a graph and the program code as two separate entities. Now the parsed program and the search key are paired in associative array and executed in discrete steps to advance through a given graph. With the method disclosed herein, progressing through graph nodes via edges is akin to stepping through program steps, but without the pointers and without the addresses.

Yet another description of the unique system is a graph stored in associative memory and a processing engine used to process an input vector where: i) the search key is a node ID and an arbitrary value produced as an output of an operation/test used as an input to associative memory; ii) the value produced from the associative memory access which at a minimum contains a node ID and an action; iii) a processing engine that "executes" the action, performing a test on the input vector to produce an arbitrary value which combined with the current node ID to form a key that is used to get the next "value" in order to "advance" the engine to the next state; and v) a host computer interface to associative memory to create/manage graph in the memory. The arbitrary value is used on both loading keys into associative memory as well as evaluating input vectors to create a search key to match any keys stored in associative memory using the arbitrary value; this provides consistent search results.

One advantage of using associative array traversed by current node ID and a computed value as next state is that edges of a graph (instructions) can be added or updated incrementally. This avoids a requirement of otherwise rewriting memory, duplicating copies of sub graphs, or recompiling a computer program.

Another advantage of the present disclosure is that the state of the associative graph memory can be coherent on each clock cycle without "long" (more than two) contiguous multi cycle "lock out" periods. Thus, updates can be made nearly real-time, on the fly, dynamic and ongoing throughout the operation and traversing of the graph. Thus, a data graph can be shared between an execution unit and a host CPU (performing dynamic updates on the fly) because of the native "coherent" nature of the associative array.

Yet another advantage of the present disclosure is the ability to accommodate large and sparse "branch space" at each node without increasing computation time or growing memory exponentially at each node. Node information is location-agnostic and is proximity-agnostic with respect to each other. Indexing is not required because node information can be disposed anywhere in memory since a subset or superset of all nodes is searched for a next node.

Furthermore, memory can be updated by another machine independent of the servant machine on which the data graph is located without being concerned about memory management. Specifically, a host machine can update associative data in the servant machine without requiring memory management of data in the servant machine, e.g., without tracking of pointers, ensuring memory coherency, etc. This solution avoids tying up the servant machine for multiple cycles during which time access to the entire memory is "locked out" in order maintain coherency between a source (a host machine) and a destination (the servant machine to the host) for the updated data.

Beneficially, a host interface maps logically to associative array constructs of contemporary languages like Python, Java, C#, etc for seamless/consistent integration at a fundamental level. This allows programmers to manage the graph (creating, pruning, balancing, etc) conveniently. One example is a dictionary method in Python.

The methods, operations, processes, systems, and apparatuses disclosed herein may be implemented in any means for achieving various aspects, and may be executed in a form of a machine-readable medium, and/or a machine accessible medium, embodying a set of instructions that, when executed by a machine or a data processing system (e.g., a computer system), in one or more different sequences, cause the machine to perform any of the operations disclosed herein. Other features will be apparent from the accompanying drawings and from the detailed description that follows. Accordingly, the specification and drawings are to be regarded in an illustrative rather than a restrictive sense. The present invention is defined by the features of the appended claims.

This summary is provided to introduce a selection of concepts in a simplified form that are further described below in the detailed description. This summary is not intended to identify key or essential features of the claimed subject matter, nor is it intended to be used as an aid in determining the scope of the claimed subject matter.

BRIEF DESCRIPTION OF THE VIEW OF DRAWINGS

Example embodiments are described by way of illustrations and are not limited by the figures of the accompanying drawings, wherein.

Figure 1A:
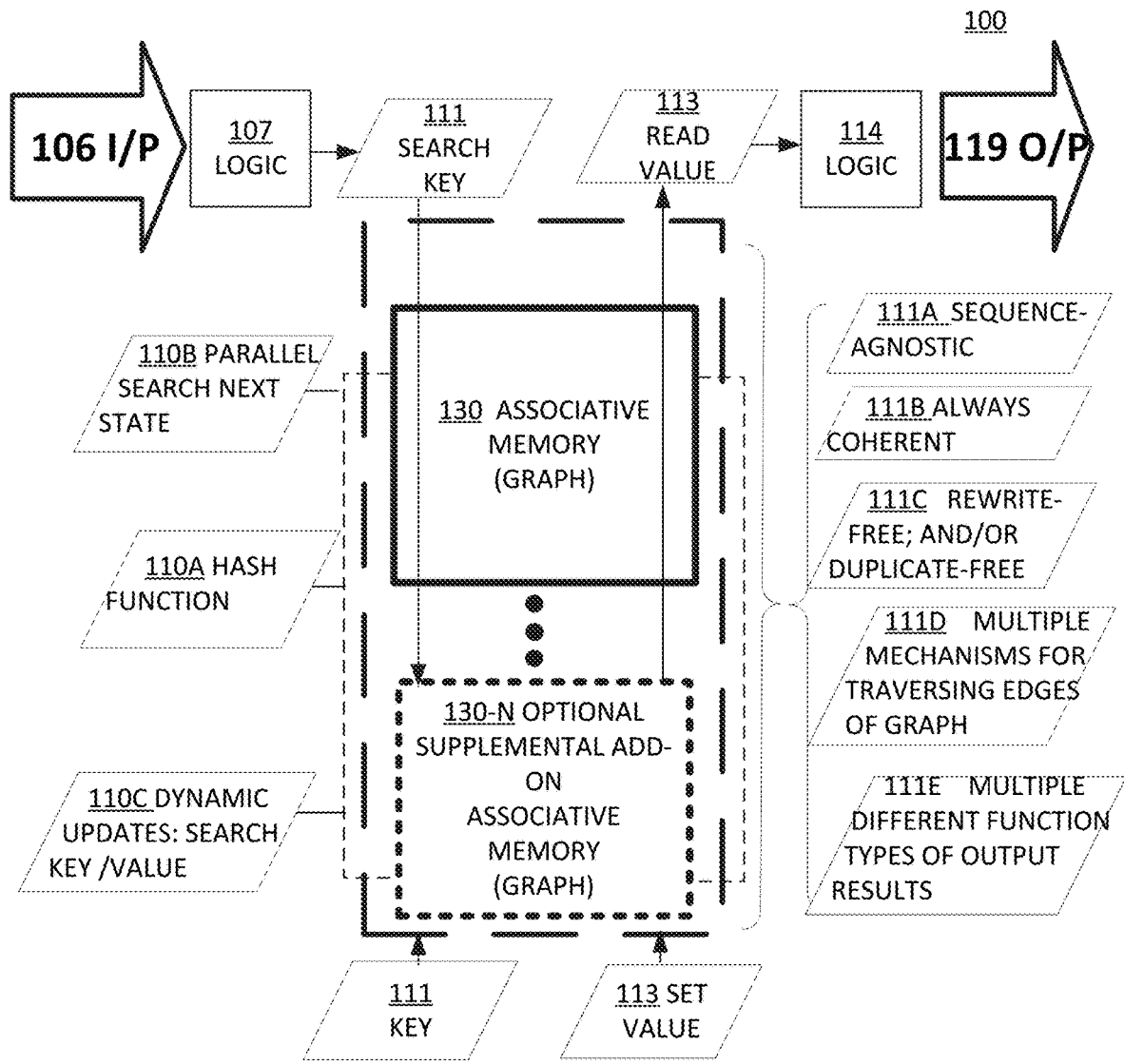
FIG. 1A is a functional block diagram of a graph memory engine using associative memory, according to one or more embodiments.

The drawings referred to in this description should be understood as not being drawn to scale, except if specifically noted, in order to show more clearly the details of the present disclosure. Same reference numbers in the drawings indicate like elements throughout the several views. Other features and advantages of the present disclosure will be apparent from accompanying drawings and from the detailed description that follows.

DETAILED DESCRIPTION

A method, apparatus and system for graph memory is disclosed. The graph memory implements automata expressed as a graph in the classical senses of data and computer science for classification and filtering functions. The result is a fast execution, with efficient and dense memory utilization, along with desirable features such as being memory sequence agnostic, being amenable to dynamic memory updates, and having always coherent memory. The present embodiment also avoids the downside of prior solutions, such as index and list functions, which suffered from memory management challenges in memory allocation, garbage collection, and heap management. In the following description, for the purposes of explanation, numerous specific details are set forth in order to provide a thorough understanding of the various embodiments. It will be evident, however to one skilled in the art that various embodiments may be practiced without these specific details.

Function Block Diagram

Referring now to FIG. 1-A, a functional block diagram is shown of a graph memory engine 100. The present embodiment advantageously utilizes an associative array for a graph function, which results in faster lookups than a list solution, and denser, higher efficiency memory space usage than an index solution. Specifically, since the desired node is identified directly and discretely in the present embodiment of associated memory, it is typically much faster than a sequential evaluation of each entry in a list until the desired entry is found for the list solution. Conversely, the present associative memory for a graph function results in smaller memory sizes, or much higher efficiency than an indexing solution in memory, since the desired node is identified directly and discretely in the present embodiment, rather than a sequentially addressed memory space, which results in inefficient memory use, especially for a sparse matrix with very few entries. Subsequent figures with specific examples will clearly illustrate these numerous improvements of the present embodiment over the alternative solutions.

Associative memory 130 can be implemented in either a random access memory (RAM), a ternary content addressable memory (CAM), a field programmable gate array (FPGA), or etc., depending on the speed, size, and power requirements of a given application, as known by those skilled in the art.

In one embodiment, a hash operation 110A, known to those skilled in the art, is used to load in specific memory locations, a graph whose shape and function is defined by the quantity and identification of one or more nodes with their respective associated data (together, key 111). This associated data includes node values, one or more edges (if any), associated tests or functions (if any), etc. (together, set value 113).

Processing input data 106 according to the graph disposed in associative memory 130 starts with logic block 107 (e.g., hashing) to generate a search key to find the appropriate node and its associated data for the given input value. Hashing is a fast, low power, and spatially efficient method of locating a key disposed in memory. A parallel search function 110B of a search key locates the key in one or more associate memories 130, 130-N, where N is any whole number integer. That is, regardless of the quantity of original or supplemental add-on associative memory, the hash function, once set up and managed, can search the entire range of original or supplemental add-on associative memory. If associative memory 130 is a CAM, then a ternary or binary search is used in lieu of Another benefit of associative memory is the ability to implement a dynamic update function 110C of stored key, including node ID, edge data, and associated data such as functions, operations, actions (test algorithm, mathematical relationships, type of data tested, etc.). In other words, a specific discrete key and associated data can be written to associative memory 130 dynamically, (when appropriate memory location is not accessed), with a corresponding update in a hash table if necessary. Edges of graph (instructions) can be added incrementally without having to rewrite memory or require duplicate copies of subgraph. The edge is easily written into memory where the hash function would place its specific position given the edge value from the hash and the node ID to which it belongs. Alternatively, another embodiment can lock down the population of a given graph in associative memory to prevent updates if that is desired for a given application.

A specific example is provided in a subsequent figure, as driven by a host processor. Note that graphs implemented in memory using list and index functions are typically static and are difficult to update on the fly. If they are updated at all, it requires multiple cycles during which access is 'locked out', during the updates in order to maintain coherency.

An associative memory that uses hashing creates very compact memory utilization, especially for a sparse matrix. It is much more efficient and dense than the alternative technology of using a list for managing a graph. This is primarily because memory usage must grow exponentially with the width, N, of the key ($2^N$ memory size) for an index solution using lookup tables (LUTs). In contrast, the associative memory of the present embodiment is typically very compact, and approximately linear, but certainly not remotely near an exponential growth.

Other beneficial features of storing a graph in associative memory and traversing the graph by hashing input for a search key include: i) sequence-agnostic function 111A of associative memory; ii) always coherent memory function 111B; iii) rewrite-free and duplicate-free functions 111C; iv) multiple mechanisms function 111D for traversing edges of graph; and v) multiple different function types of output results 111E.

Specifically, for i), sequence-agnostic function 111A for associative memory allows hashed keys to be consistently located where the hash associates the key, regardless of the sparsity of the matrix, and regardless of normal sequence such as that used in an index function graph. Ensuring an efficient and non-aliased (or rarely aliased) hash improves the existing embodiment even more.

Additionally, for ii) always-coherent memory 111B results because of the hash functionality, as applied to a memory graph, which allows discrete write accesses. Thus, the present embodiment does not require re-sorting of an alternative solution that is a list function where a list is resequenced for a newly added entry to the list, e.g., in a middle of the list. Alternative solutions of list and index functions tend to have other memory management issues involved with coherency, such as memory allocation, garbage collection, heap management, etc. A list function implementation that uses high fan-out (many edges leaving a graph node) with a large key can also cause an undesirable increase in processing time.

With the present solution, the hash function manages these coherency and other memory management issues without the overhead associated with the noted alternatives, thereby resulting in a less computationally intensive operation, with a comparable less frequent debug occurrence.

Those functions suffered from memory management challenges such as memory allocation, garbage collection, and heap management, Furthermore, the present embodiment is also iii) rewrite-free function and a duplicate-free function 111C meaning that edges of a graph (instructions) can be added incrementally without having to rewrite memory or require duplicate copies of subgraphs (coherency and handoff issues). Instead, the present embodiment simply adds a new edge discretely in memory where the hash function would place it, assuming no aliasing.

One additional benefit of the present embodiment is iv) multiple mechanisms for traversing edges of a graph, including edge-selection based on a certain value (the sole mechanism for index and list functions) based on a test, based on a mathematical relationship or algorithm, etc.

Finally, item v) multiple different types of output results are provided by the present invention besides just geographical endpoint information. This result can be thought of as a pointer, e.g., to an address containing data. Instead, the present embodiment can provide geographic endpoint information as well as numeric values, queues, sorting and sequential placement functions, etc.

More examples to these benefits and advantages are provided by way of example in the subsequent figures with specific graphs, memory entries, different functional outputs, etc. Overall, the present embodiment results is a fast execution, with efficient and dense memory utilization, along with desirable features such as being memory sequence agnostic, being amenable to dynamic memory updates, and having always coherent memory.

Figure 1B:
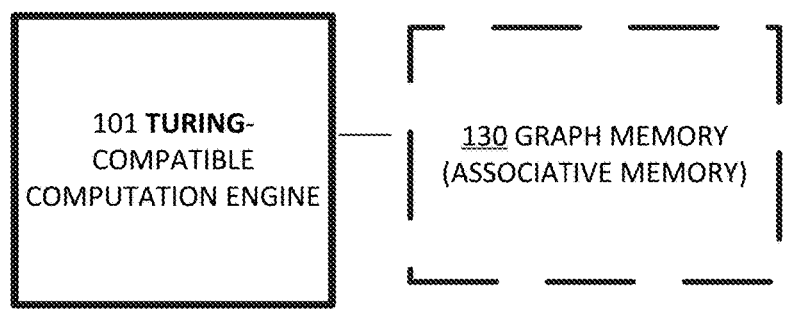
FIG. 1B is a functional block diagram of a Turing-compatible computation engine sourcing instructions from a graph memory engine, according to one or more embodiments.

Referring now to FIG. 1B, a functional block diagram of a Turing-compatible computation engine 101 sourcing instructions from a graph memory 230, according to one or more embodiments. A Turing-compatible computation engine 101 includes storage, conditional branching, instructions, and an input and output. In addition, the Turing completeness of a system is said to be the ability for a system of instructions to simulate a Turing machine theoretically capable of expressing all tasks accomplishable by computers. In the present embodiment, a canonical requirement of a Turing machine that is not required is a sequential memory to store data. Yet, a non-sequential memory for storing data, or program instructions, that is accessible for state changes, satisfies a functional requirement of operation. For more details, see reference John Hoperoft and Jeffrey Ullman (1979). Introduction to Automata Theory, Languages, and Computation (1st ed.). Addison-Wesley, Reading Mass. ISBN 0-201-02988-X. Centered around the issues of machine-interpretation of "languages", NP-completeness, etc.

From its inception Turing's machine had the concept of sequential processing: "The machine operates on an infinite [4] memory tape divided into discrete "cells".[5] The machine positions its "head" over a cell and "reads" or "scans"[6] the symbol there. Then, as per the symbol and the machine's own present state in a "finite table"[7] of user-specified instructions, the machine (i) writes a symbol (e.g., a digit or a letter from a finite alphabet) in the cell (some models allow symbol erasure or no writing),[8] then (ii) either moves the tape one cell left or right (some models allow no motion, some models move the head),[9] then (iii)

(as determined by the observed symbol and the machine's own state in the table) either proceeds to a subsequent instruction or halts the computation.[10]".

See references cited above for more detail, which said references are incorporated herein by reference herein: [4] Cf. Sipser 2002:137. Also, Rogers 1987 (1967):13 describes "a paper tape of infinite length in both directions". Minsky 1967:118 states "The tape is regarded as infinite in both directions". Boolos Burgess and Jeffrey 2002:25 include the possibility of "there is someone stationed at each end to add extra blank squares as needed". [5] Cf. Rogers 1987 (1967): 13. Other authors use the word "square" e.g. Boolos Burgess Jeffrey 2002:35, Minsky 1967:117, Penrose 1989:37. [6] This word is used by e.g. Davis 2000:151 [7] This table represents an algorithm or "effective computational procedure" which is necessarily finite; see Penrose 1989:30ff, Stone 1972:3ff. [8] Boolos Burgess and Jeffrey 2002:25 [9] Boolos Burgess Jeffry 2002:25 illustrate the machine as moving along the tape. Penrose 1989:36-37 describes himself as "uncomfortable" with an infinite tape observing that it "might be hard to shift!"; he "prefer[s] to think of the tape as representing some external environment through which our finite device can move" and after observing that the "'movement' is a convenient way of picturing things" and then suggests that "the device receives all its input from this environment. [10] Also by convention one of the states is distinguished as the stopping state and is given the name HALT" (Stone 1972:9). Turing's original description did not include a HALT instruction but he did allow for a "circular" condition, a "configuration from which there is no possible move" (see Turing 1936 in The Undecidable 1967: 119); this notion was added in the 1950s; see more at Halting problem.

While in concept a machine which is Turing complete is not required to execute instructions sequentially, most all execution engines have a "program counter" implying that the norm is to execute instructions in sequential memory location, where branching is the exception to the norm. This allows CPU instruction caches with prefetch to work because a burst load from main memory to load the cache assumes that some number of locations after the missed address location will be needed for execution before the next branch happens. This is testimony to the fact that programs and CPUs execute instructions in a sequence before branching. This tends to set the burst size of DRAMs, which has been optimized for cache line refills to support the average instruction execution run lengths before branching.

What sets the present embodiment apart from conventional architectures is that present embodiments are Turing complete and assume that every new instruction executed can come from a non-sequential address. This facilitates applications that are patterned after decision trees and graph processing.

System Architecture

Figure 2A:
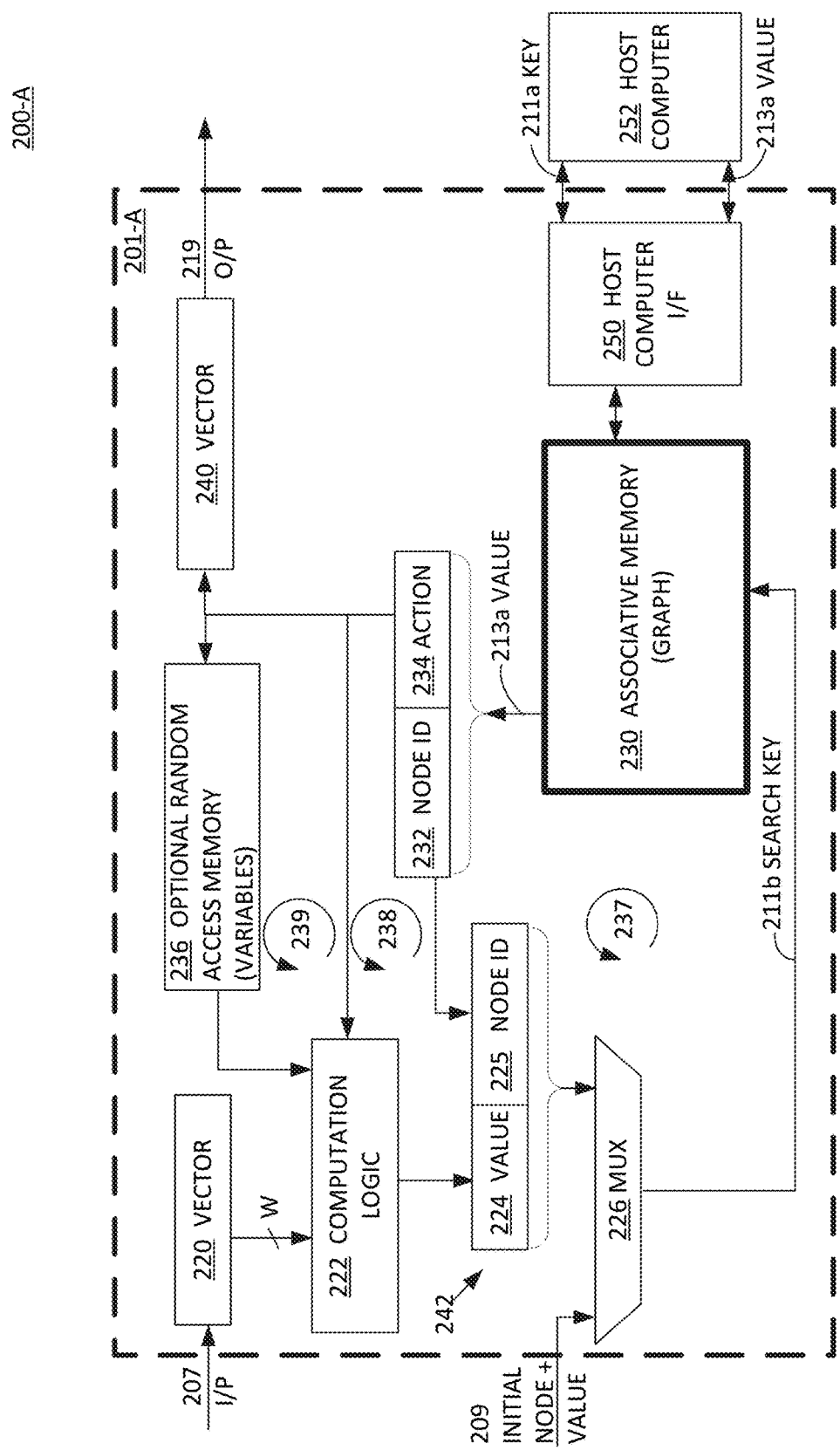
FIGS. 2A-2B is schematic block diagram of a graph memory engine utilizing associative memory, according to one or more embodiments.

Referring now to FIG. 2A, a schematic block diagram of a graph memory engine (GME) 201-A is shown, according to one or more embodiments. Present FIG. 2A is one embodiment of Turing-compatible computation engine 101 of FIG. 1B, and particularly that a next program instruction is fetched from memory, e.g., in this case via a computed value. GME 201 provides a component level schematic of the data flow and control in GME 201-A used to generate a new search key, and a resultant value output from associative memory that advances a state in the automata scheme along the graph memory. In one embodiment, GME 201-A performs a similar function to a CPU or GPU, and thus, with some system adaptations, is a socket alternative. The present disclosure envisions a wide variety of internal coupling arrangements and feedback loop arrangements with different or additional functional blocks disposed therein, in different embodiments to accomplish different data processing applications more efficiently in terms of one or more resources.

GME 201-A comprises, at its core, an associative memory 230, an embodiment of graph memory 130 of FIG. 1B, which stores therein graph data in the form of one or more nodes (or vertices), its respective (zero to many) edge values (or vectors) pointing out from each of the nodes, and the associated downstream node identification (from zero to multiple) and its related operations (if any) associated with each node, such as a next node ID, a result, and an input test. The description of associative memory 230 (or associative array), provided in FIG. 1 applies here. Subsequent figures illustrate a few examples of the infinite number of shapes, sizes, conditions, tests, etc. of a graph stored in memory (a memory graph).

A true CAM implementation of associative memory 230 requires neither an index nor a program pointer as inputs from a graph memory engine, and requires neither an index nor a program pointer for its internal implementation level. Some associative memory implementations can utilize pointers or indexes on an internal implementation level, but for a current embodiment of the present disclosure, no explicit program pointer or index information is required to be externally input to the associative memory. Rather, the associative memory locates associated data in the memory based on an a starting operation of providing an input search key, as known by those skilled in the art to find if any matches exist as a key (same content as search key) already stored in the associative memory. That is, associative memory always starts with a search key value, which is a portion of the content stored in the memory and uses that search key value to locate the memory word line. Other data disposed in the same word line as a key, is relevant associated data that is output as a desired information and tied to the search key first used.

A hash table implementation of associative memory 230, calculates possible locations of a search key in the memory, with an output including a small finite number of several locations or less that could be the desired memory location. Each of those results from the small finite number of several locations are discretely retrieved and checked to verify a matching key to the search key.

A search key 211b is generated from a pipeline of components coupled to each other beginning with a memory register vector 220 coupled to computation logic in parallel with an input from optional RAM 236 (for storing variables). The search key is a state identifier, which is a node ID of a memory graph in the present embodiment that is adjoined, or concatenated, with an edge value in search key generator 242. The edge value is an output of at least a portion of an input vector and/or a variable (or arbitrary value) from RAM 234). Computation logic 222 couples downstream to memory register value 224 and memory register node ID 225 whose combined output is muxed 226 with an initial node and value input 209. Output from mux 226 feeds into associative memory 230 as a hashed value to determine a value output 213a comprised of a next instruction, stored as memory register next node ID 232 and memory register next action 234. Mux 226 is simply an element to allow for initialization or starting point the graph memory operation.

An input data string 207 is stored as a vector in a register or cache memory 220. A portion or all of the vector is selected (bit width 'W') (per an action from associative memory 230) and communicated to coupled computation logic 222, which said logic is designed for performing given tests, operations, etc. from memory register action 234 fed thereto, along with optional variable(s) from RAM 236, all coupled together. Computation logic 222 optionally includes an arithmetic logic unit (ALU) module therein for performing mathematical operations and/or tests on input vector. Examples include a ternary match, test one or more bits against some value, mathematical logic such as equalities or inequalities greater than or less than, multiply operation, Bayesian calculation, support vector machines (SVM) (sorting and sequencing), extract bits, determine a range of bits, etc.

In the present embodiment, output value 213a from associative memory 230 is not a pointer value per se, e.g., not a program pointer for instructions, as used in prior art solutions, such as index based graph memory. Rather, output value 213a is an instruction comprised of a node ID 232 and an action 234 (stored in a register, cache, etc.) used to generate a new search key 211b. The action can be a wide range of functions, tests of input or RAM, operations to generate output results to a queue and/or output data results, as described in examples of subsequent figures. Specifically, Node ID 232 is a current node ID that is fed back into a node ID 225 portion (stored in a register, cache, etc.) via recursive loop 237 for a new search key 211b that is output from mux 226. Ultimately, output value 213a from associative memory 230 directly and indirectly is used to form a new unique search key 211b that will then match one entry in associate memory to yield a next output value from a hashed memory location. Thus, again, associative memory 230 does not store or output pointers per se, to an indexed memory location in associate memory. Rather, a complex algorithm and relationship working on the output instruction 213a from associative memory along with incoming data 217, optional random access memory (RAM) variables 236, and other action and computational logic operations 222 result in the new search key 211b.

The hardware components in FIG. 2A are coupled to form recursive loops 237, 238, and 239 to feedback data output from associative memory 230 to create a new search key for advancing a state in the automata scheme, by traversing the associative array. These feedback loops manifest as graph memory progression along a given branch, or edge, from a given node to a next node in the graph memory. Said automata scheme will be clearer in examples illustrated in subsequent figures. Also feeding this new search key 211b is an output from memory register for action 234 that inputs an action into computation logic 222 for execution, via recursive loop 238. Lastly, feeding into the new search key 211b is the output from memory register for action 234 that parallely feeds into optional RAM 236 for selection of an optional variable to be fed into combination logic 222, all via recursive loop 239. The recursive hardware and respective data feedback loops 237-239 enable the associated node, tests, and action output from associative memory 230 to advance the automata graph memory engine to a next node and edge defined by the search key it generates.

Output 219 from GME 201-A can be a wide range of values ranging from a numerical value, a geographical position, etc. Output 219 is processed in memory register vector 240 from memory register action 234 as derived from value 213a output from associative memory 230.

A GME system 201-A is formed when GME 201-A is communicatively coupled via a host computer interface 250 to host computer 252 to communicate keys 211a and values 213a to program in associative memory 230. The benefit of using associative memory 230 for graph memory is that many operating systems utilize languages having associative memory constructs, including but not limited to: C# which has a math function; Python which utilizes a dictionary method; Java etc., used to manage the data graph (e.g., creating, pruning, balancing, etc.). Thus GME 201-A is software agnostic. Fortunately, the software does not need to control and manage the memory directly in terms of reading and writing accesses, managing resource usage and buffers, and allocating memory, etc. Rather, the associative memory constructs operate independently and transparently, with the hashing function and search key execution being self-managing.

The interface from host computer 252 to associative memory 230 allows the dynamic programming of GME 201-A to update keys 211a and values 213a on the fly, in the present embodiment. Because memory is configured as associative memory 230, it allows an individual access overwrite to a value portion of data associated with a given key disposed therein. New nodes can also be written into associative memory 230 that did not exist before. The hash operation on a given node and edge determines its location in memory. During a non-operation cycle, or by use of a dual port memory structure, the new node and edge (and associated data of new node, test and/or action) can be written into the appropriate memory location while associative memory 230 is performing an access to a different memory location. In another embodiment, key and value data is loaded into associative memory 230 during initialization and left unchanged during an operational period as a static implement (that is not updated or dynamically changed until a new reboot or initialization).

In one embodiment, the use of an associative memory (in any of multiple implementations), that is pointerless and indexless to the GME 201-A, for fetching a next program instruction and/or deciding whether it is possible to advance to a next state, offers transparent and efficient operation of the GME 201-A for classification, filtering, and other functions. For example, using an associative memory in the present embodiment, GME 201-A, an edge value width of $2^F$ bits is possible, where F is a whole positive integer, which means a fan-out capability of $2^F$ entries in a single level with efficient memory usage. This is possible without GME 201-A using a program pointer and index management system of memory that would require $2^F$ entries.

For example, if the present embodiment had only two edge values in the $2^F$ space (a sparse matrix), then the associative memory 230-A would have only two entries in memory space. In comparison, an indexed RAM managed memory by an alternative graph solution, would require the full $2^F$ memory space be allocated for only two edge value entries in a single level (shallow tree). An alternative indexed memory managed approach would be to create a high or wide (a tall tree) with multiple levels, say only two edges for each level, then it would require F levels, which adds lookup time, energy consumption, and other memory management headaches such as location tracking, coherency, garbage collection, heap management, more extensive locations updates, etc. Granted, associative memory is more expensive than non-associative RAM memory. But the net overall gain of using associative memory for GME 201-A for traversing program instructions, especially for high utilization of branching and/or high-utilization of fan-out, in memory and advancing states, is clearly superior with associative memory, for at least the reasons of i) memory is efficiently utilized and wasted space for sparse matrices is minimal; and ii) the result is a transparent program instruction memory storage and access that is fast, efficient, and low overhead. Specifically, the multiple available implementations of the associative memory is disassociated with the use thereof by GME 201-A. Applications that use these feature strengths are classification applications and algorithms such as graph processing, and more specifically, classification systems such as packet classification, network traffic management, as well as machine learning classification applications.

Overall, GME 201-A provides a fast, low power, area efficient, compact, self-contained, and programmable graph database that is dynamically updatable, provides reliable coherency every cycle, and has numerous customizable operations, tests, and outputs that are not available on any other solution. While GME 201-A is illustrated as a hardware schematic, the functionality and sequencing of the components and operations can be implemented in a wide range of combinations of hardware, firmware, software solution as well. Therefore, for example, illustrated components can all being integrated on a single chip, on a single or multi-chip module package, as discrete components on a board or a card, etc. Alternatively, some block components could be implemented as firmware, with others implemented as hardware. Any combination of register transfer logic (RTL), firmware, proprietary or hardware memory engine, general-purpose processor, FPGA, GPU, and other processing units can be combined to provide the means for the functional blocks shown. Associative memory 230 is typically off-chip, but can be on-chip, or a combination thereof.

Figure 2B:
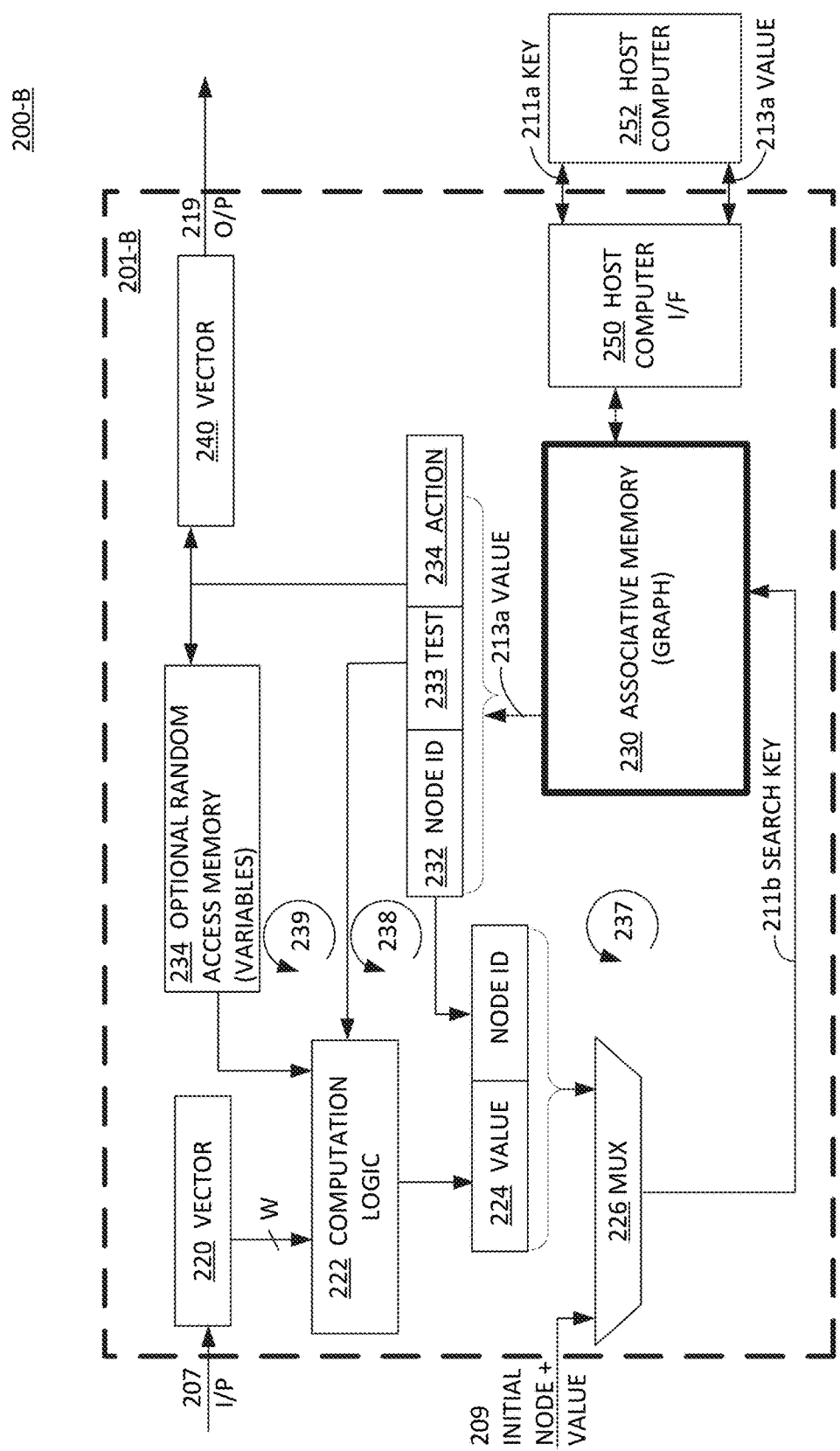

Referring now to FIG. 2B, a schematic block diagram of a graph memory engine (GME) 201-B is shown, according to one or more embodiments. FIG. 2B is identical to FIG. 2A, and includes its description herein, except for the addition of an extra field of 'test' that is stored in associative memory 230 and that is output and stored in memory register test 233, and communicated to computation logic 222 via recursive loop 238. In particular, test is unique to controlling computation logic 222 and is not coupled to output vector 240, as is action instructions from memory register action 234. By utilizing two separate fields of test 233 and action 234, the present embodiment provides more discrete tailoring of search key and a results output from GME 201-B, which certain applications require. The present disclosure envisions more or different fields in the instructions that are the associated instructions with a given node ID and edge value that are coupled to programmable or fixed function elements in the schematic of the present figure, adapted for particular applications, or more compressive multi-function applications.

Figures 3A, 3B:
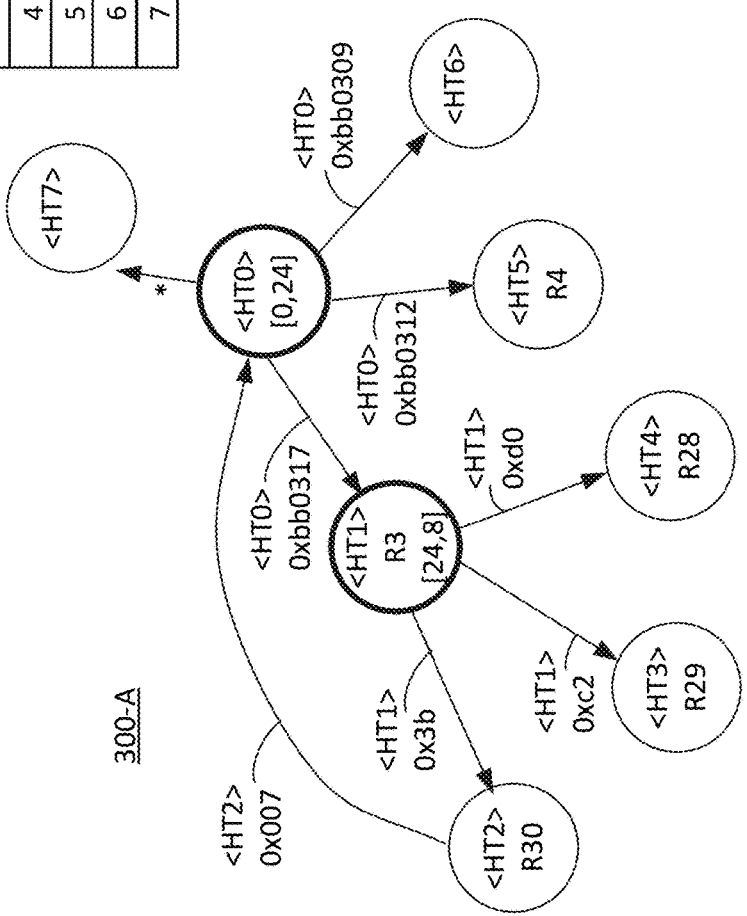
FIGS. 3A-3B are a spatial tree illustration and its associative graph memory contents for an exemplary memory graph, respectively, according to one or more embodiments.

FIGS. 3A-3B are a spatial tree illustration and its associative graph memory contents for an exemplary memory graph, respectively, according to one or more embodiments. The graph memory contents 300-B are drawn to resemble a tree 300-A, with different limbs or branches (edges) that traverse to new joint (vertex). Some limbs and braches end abruptly as a stub (or spur, or leaf) with no joint (vertex) and no subsequent edges. Other limbs and branches will fan-out (branch out) to multiple other limbs or branches at a vertex only once, or in a serial fashion with multiple vertexes located downstream from each other with a wide variety of combinations of fan-outs at each vertex. The extent of branching and conditions for which a given limb or branch will branch out is in the control of the designer. A memory graph can have any shape desired with any rules and conditions, tests, functions, modeling of a physical or virtual system, etc. as desired for a given application and as devised by a given programmer. For example, classification and filtering functions can be performed with automata expressed as a graph in the classic sense of data and computer science.

The current 'node' value in the associative graph memory 300-B and on the tree 300-A correlate to each other, respectively, e.g., <HT0> to <HT0>, etc. Similarly, a given node's edge value(s) (if any) in the graph memory and on the tree, correlate to each other, e.g., <HT0>0xbb0317 to <HT0>0xbb0317. In the present example, node <HT0> has three possible paths, or edges, of <HT0>0xbb0317, <HT0>0xbb0312, and <HT0>0xbb0309. Each edge associated with a node repeats the node ID in the associative graph memory 300-B to provide a unique combination of the node ID and the edge value. This in turn provides a method of traversing the graph memory using a hash function of the unique combination of node ID and the edge value. Thus, instead of an index function or a list function for data graphing, which identify edge(s) of a given node based only on the memory location of the edge itself, (e.g., edges for a given node are in a specific range, with any modification of a location or expansion of a list requiring a lockout to provide coherency between the source and destination.

The left two columns of the associative graph memory 300-B are the current state, or node ID in a graph embodiment, and each edge associated with the current node. The unique edge value, e.g., hexadecimal value 0xbb0317, is obtained using an algorithm implemented in GME 201-A, 201-B of FIGS. 2A, 2B. Input test (col. F) indicates what part of an input vector 207 into register 220, to extract and communicated to computation logic, or engine, 222. For example, row 1, col. F indicates [24,8] meaning start at bit 24 and take eight bits, thus W equals eight in this embodiment for the bits passed to the computation engine. An input test of [−,−] means the graph terminates at a leaf, or stub, with no subsequent edges going out from the next state, i.e., node ID<HT1> in row 1, col. D. The third column from the left is an arrow transition from to the next node and its related result and input test, stored in the right three columns. This information is stored in the associated array 130 and 230 of FIGS. 1 and 2A-2B. When a search key identifies a unique given node and edge in associative graph memory 300-B (as a single line entry), the associated data of the next node, result, and input test are output for processing by GME 201-B, 201-B. Because this data is located in associated memory 300-B as a single line item, it can be updated dynamically and on the fly as a single write access to memory. This can be done without multiple cycles required in alternative solutions, during which time access to the entire memory is "locked out" in order to maintain coherency between a source (a host machine) and destination (a servant machine to the host) for the updated data. For example, in the present embodiment, if edge 0xbb0312 to a possible next node <HT5> is desired by a programmer to not be an available to node <HT0>, then the second row in the associative graph memory 300-B is overwritten or flagged as not valid, in a single cycle operation while maintaining coherency between source and destination.

Referring specifically to the operation of this current graph memory, an initial node of <HT0> (circle) shown in tree 300-A starts at some 'initial node and value' input 209, as shown in FIG. 2A. In an exemplary embodiment (not shown), a first eight bits of the input vector is selected and communicated to computation engine 222. If a match exists to existing edge value to the initial node <HT0>, e.g., "<HT0>0xbb312" or "<HT0>0xbb0309", then the state is advanced to the next node along the matching branch, or edge value, in tree 300-A, then the graph memory would traverse to those memory locations shown. This operations would correspond to matching a search key to row 2 or 3 respectively in the graph memory 300-B. If said match did not exist (to "<HT0>0xbb312" or "<HT0>0xbb0309"), then as a default, the operation would traverse to node <HT7> along edge "*" shown in tree 300-A, but not shown in graph memory 300-B, since it is a default for nonmatch that is handled in code and logic outside graph memory 300B. The balance of the row entries in graph memory 300-B are represented similarly in tree 300-A as node IDs and edge values.

Rows 1-7 of graph memory 300-B appear to be sequential, but are only shown as such for purposes of simplicity in this example. The actually memory location of these rows of data depends on an associative memory function, which could be a hash table (location determined per hash function result), or could be a content addressable memory (CAM) (could exist in any order) a special type of computer memory used in certain very-high-speed searching applications, and etc. for other implementations of an associative memory.

Figure 4:
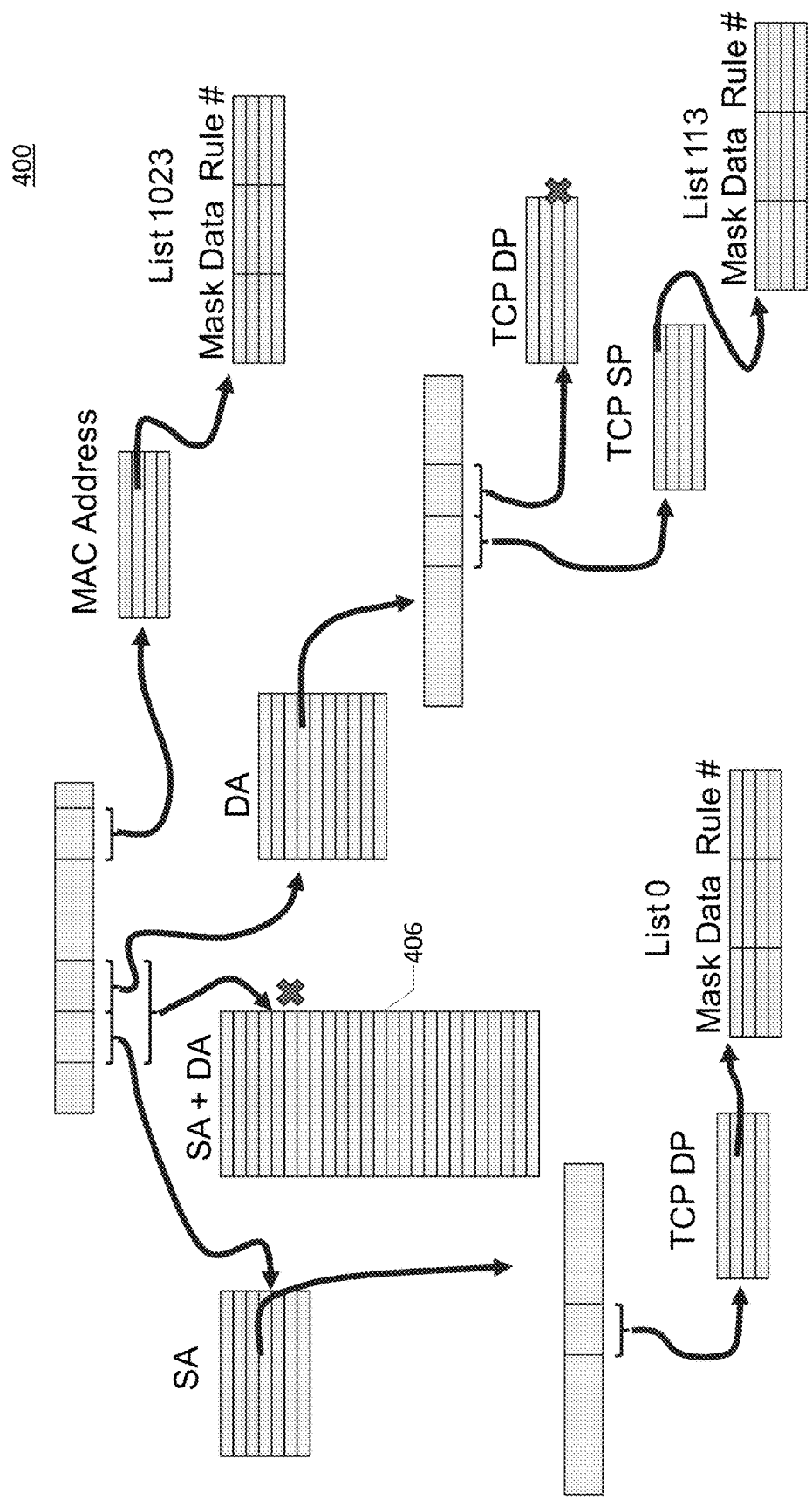
FIG. 4 is a pictorial representation of network traffic management scenario with an access control list set of rules for classifying a packet, according to one or more embodiments.

Referring now to FIG. 4, a pictorial representation is shown of network traffic management scenario with an access control list (ACL) set of rules for classifying a packet, according to one or more embodiments. The takeaway from this figure is to note that a traffic engineer will generate rules describing which packets will be allowed passage in a network connection based upon some combination of source address (SA), destination address (DA), source port (SP), destination port (DP), media access control (MAC) address, etc. after masking and applying specific rules, etc. It is this set of rules that is implementable in a graph memory for quickly evaluating rules based on an input vector (say the packet header), and providing an output result, or vector, that would indicate if a given packet's header satisfied the rules or not, say with a go or no-go output. The rules from this scenario of traffic management are applied to graph memory in the immediately following figures.

Figure 5:
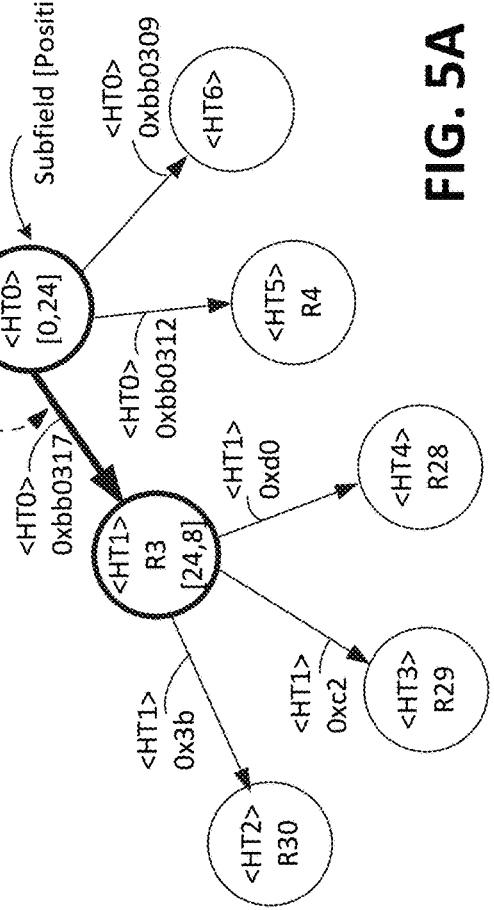
FIGS. 5A-5C are an exemplary input vector, graph memory data, and spatial tree illustrations, respectively, that implement a rule set for an access control list that classifies packets for traffic management purposes, according to one or more embodiments.

Referring now to FIGS. 5A-5C, exemplary input vector, graph memory data, and spatial tree illustrations are shown, respectively, that implement a rule set for an access control list that classifies packets for traffic management purposes, according to one or more embodiments. The present figures implement the ACL rule set from the immediately preceding figure that pictorially illustrated the rules.

In FIG. 5C, an input vector 500-C of the packet header is shown of fourteen 8-bit words. A first set of bits in the header starting at bit 0, and the next 24 bits, i.e., [0,24], is selected per an initial edge value for initial state, aka initial node ID, <HT0>, which is shown as input 209 of FIG. 2A, (but not shown in graph memory 500-B in the present figure).

The resultant 24-bit input vector bits '10111011 00000011 00000111' is represented in a hexadecimal edge value of '0xbb0317', shown in FIG. 5C. A search key is generated via search key generator 242 of FIG. 2A that concatenates initial node ID<HT0> with initial edge value '0xbb0317' for search key '<HT0>0xbb0317' that matches column A and B of row 1 of graph memory 500-B in FIG. 5B. As a result of that matched search key, graph memory 500-B (aka associative memory 230 of FIG. 2A) will output the instruction from the same row 1 of graph memory 500-B in columns D, E, and F as the <result>, <node>, and <test>. Specifically, this instruction output from graph memory 500-B, row 1 is a <result> output of 'R3', a next <node> output of '<HT1>' (as shown by the dark arrow 'edge' and darkened circle for '<HT1>' in tree 500-A), and a next <test> of examining from bit number 24 for the next eight bits, i.e. '[24,8].' This is how the state is advanced in graph memory from state '<HT0>' to state '<HT1>'.

A subsequent transition from state '<HT1>' to a new state (if any) will be determined by the next test of examining said bit field '[24,8]' of input vector 500-C, which are bits '11010000.' And so, the example can continue until either i) a 'no test' condition of '[–,–]' in col. F of graph memory 500-B which represents a 'end' condition and report result of an 'R' value in col. D; or ii) no edge value matches a latest test of say '[x, y]', at which point a default state as described in prior FIG. 3A is reached, in one embodiment.

Figure 6:
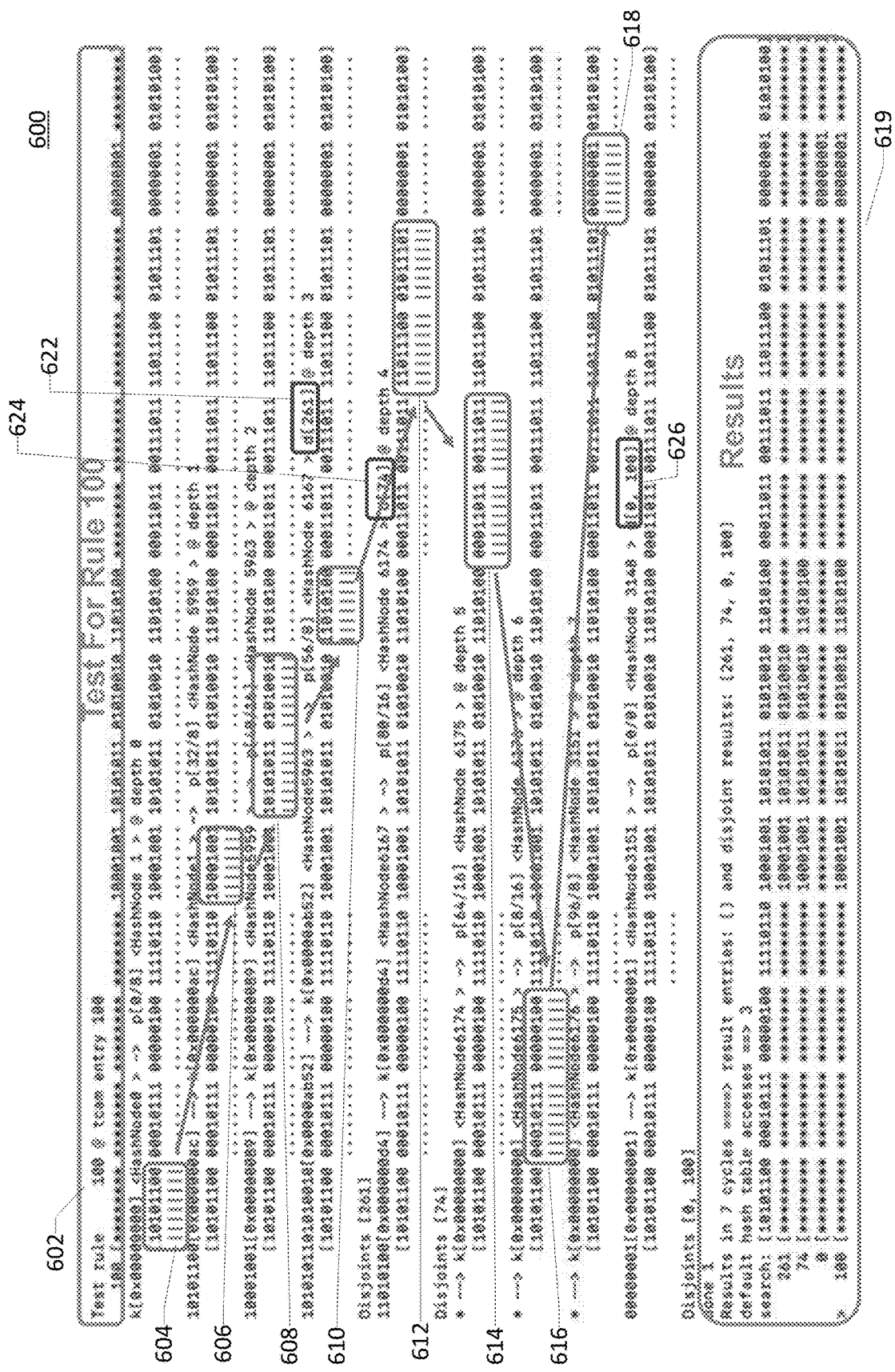
FIG. 6 is an exemplary data file illustrating the state progression of an executed rule set in graph memory for an access control list that classifies packets for traffic management purposes, according to one or more embodiments.

Referring now to FIG. 6, an exemplary data file 600 is shown illustrating the state progression of an executed rule set in graph memory for an access control list that classifies packets for traffic management purposes, according to one or more embodiments. Data file 600 is presented for the purpose of showing the advancement of states for different input vectors when compared to program instructions that define node IDs and edge values for some arbitrary given tests 602 for a rule, e.g., rule 100.

For example, an input vector beginning with a first eight bit word 604 of '10101100' matches the rules for test rule 100, which has wildcard "*" for the first eight bits, and thus any data of an input vector would pass. The vertical lines under 604 indicate that those bits were examined, while the ellipses for the balance of the words were not examined. Advancing down a lower node ID for rule 100 instructions, the same input vector is tested for the fifth eight-bit word 606 of '10001001' which matches the fifth eight-bit word of rule 100, and so continues to a next node ID. In the next node ID and associated instructions, the sixth and seventh eight-bit words 608 of '10101011 01010010' again matches the corresponding sixth and seventh eight-bit words of tests 602 for a rule, e.g., rule 100. The same occurs with the eight 8-bit words 610. Even the thirteenth eight-bit word matches tests 602 for a rule, e.g., rule 100 (thought not shown in this example). The result is that a rule identification 622 of 'd[261]' will be provided on a vector 240 that is output 219 from GME 201-A, per FIG. 2A, as a result. Similar analysis occurs on next rules 'd[741]' and 'd[100] (the original rule comprising the tests for rule 100), albeit different paths or edges all of which are shown in the results box 619 at the bottom of FIG. 6.

Figures 7A, 7B, 7C:
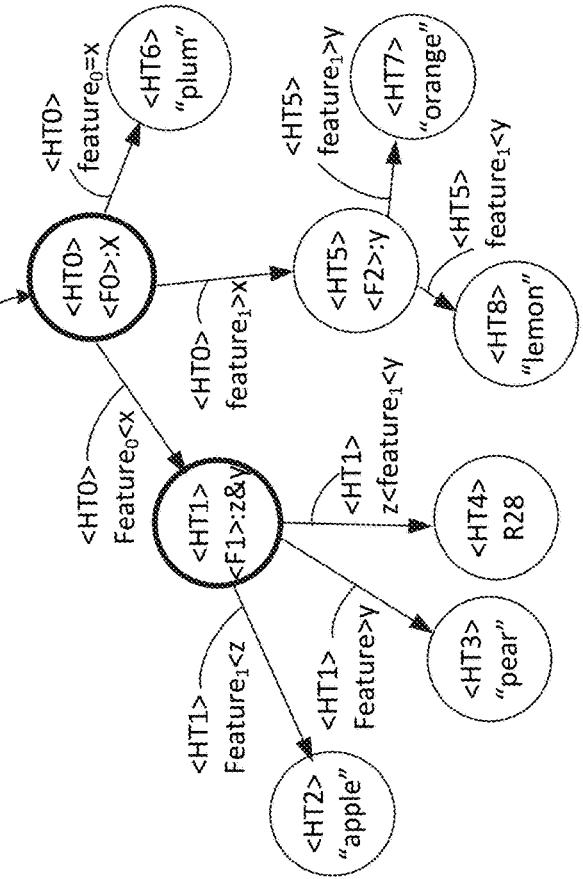
FIGS. 7A-7C are a spatial tree illustration; its associative graph memory contents for an exemplary memory graph; and classification input, respectively, for a feature decision tree, according to one or more embodiments.

Referring now to FIGS. 7A-7C, a spatial tree 700-A illustration and its associative graph memory contents 700-B and classification input 700-C, respectively, for a feature decision tree are shown for an exemplary memory graph, according to one or more embodiments.

Classification input has five different features in this arbitrary example, namely F0 thru F4. In this simple artificial intelligence example, classification of fruit is the goal. The classification input vector 700-C can be any user-defined metrics or values for the subject matter, with the current example of fruit being logical metrics of color, seed quantity, seed size, etc. Using as input, data from a graphic picture of multiple fruits to be categorized, an initial node '<HT0>' to check feature 0 (F0) of input vector 700-C and the resultant value of the operation as possible edges shown as rows 1-3 in col. B ("<x", ">x", or "=x") of graph memory 700-B, and as shown pictorially in tree 700-A. The initial node ID and value are loaded per input 209 to GME 201-A in FIG. 2A. The value x for feature F0 can be a numerical value for a color on a visible portion of the spectrum. Depending on the results of a given fruit picture input (or fields that are predefined according to the features), a given fruit will traverse down the spatial state tree, and the graph memory 700-B until no 'operation' is listed in col. F. Overall, FIGS. 7A-7C are a simple method to illustrate the powerful tool of associative graph memory use for classification of input.

Figure 8:
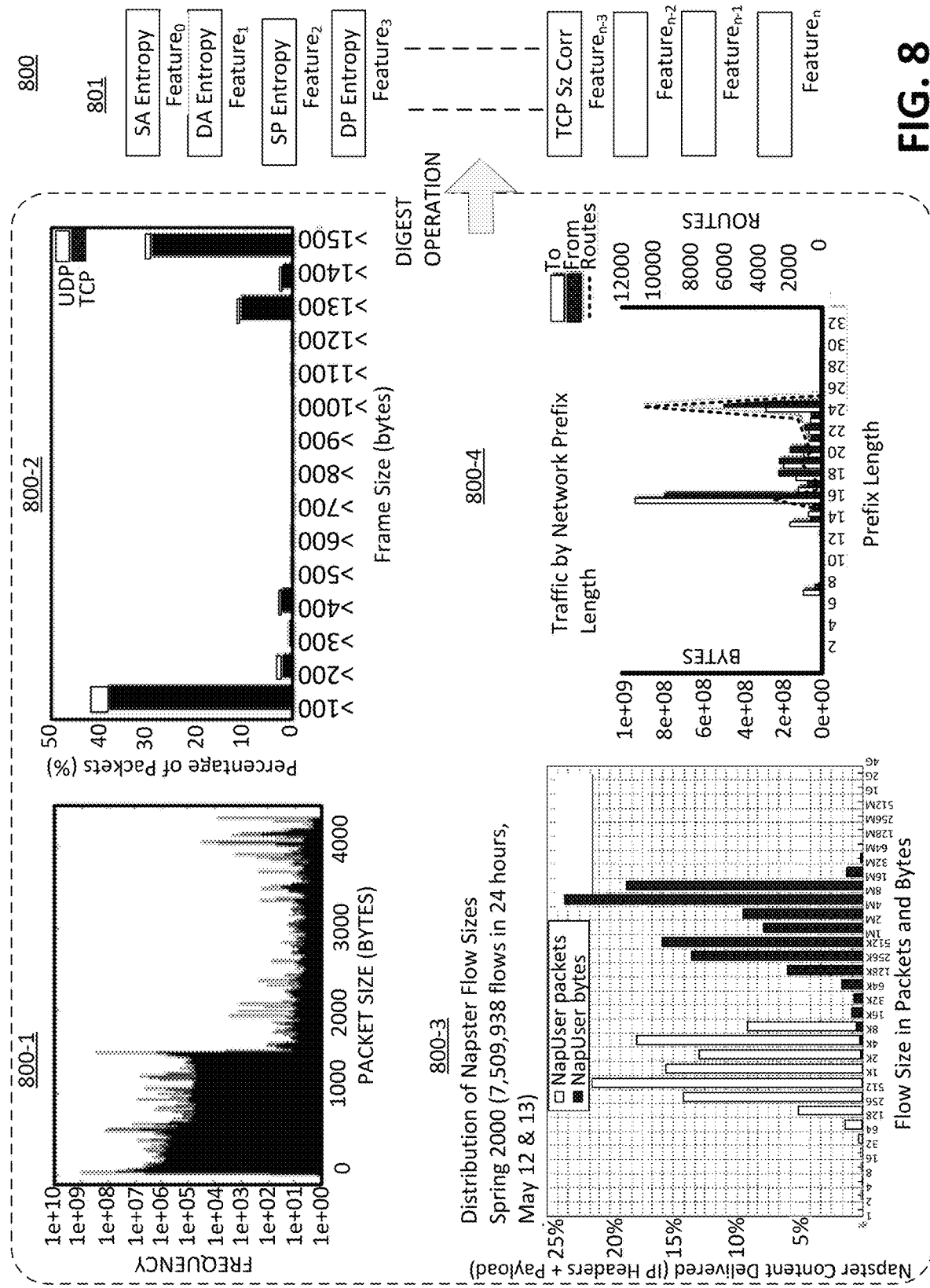
FIG. 8 is an illustration of statistical results from several process feature samples that will be used to detect network traffic anomaly, according to one or more embodiments.

FIG. 8 is an illustration 800 of statistical results from several process feature samples that will be used to detect network traffic anomaly, according to one or more embodiments, according to one or more embodiments. Statistical histogram chart 800-1 shows a sharp drop in frequency of packet sizes above 1000 bytes. In comparison, histogram chart 800-2 for frame size for packet size in bytes is bathtub-shaped, showing high percentage at the low and high end of the range of values. Then histogram chart 800-3 of a distribution of Napster flow sizes indicates an offset and different pattern between user packets versus user bytes. Finally, histogram chart 800-4 illustrates traffic by network prefix length on the axis and in terms of bytes and routers on the left and right ordinates. These data are utilized in subsequent FIG. 9 for classification and/or decision making using a graph memory.

The use of graph memory, for each of a list 801 of multiple different features, helps makes an overall decision with the data, for applications such as machine learning and Feature-0 for source address (SA) Entropy, Feature-1 for destination address (DA) Entropy, Feature-2 for source port (SP) Entropy, Feature-3 for destination port (DP) Entropy . . . Feature-n–3 for transmission control protocol (TCP) size correlation, etc. The histogram curves are enhanced by processing with a digest function on the data, e.g., convolution filter, entropy solution, etc. An entropy solution helps to elaborate whether the measured data was random or uniform. Overall, the digest data of the different features of network traffic helps to identify the shape of the performance: whether it was a spiky curve or histogram, a bathtub shape, mostly random, or etc. Making sense of the histogram data is further aided by use of graph memory for decision making, as explained in the subsequent figure.

Figures 9A, 9B, 9C:
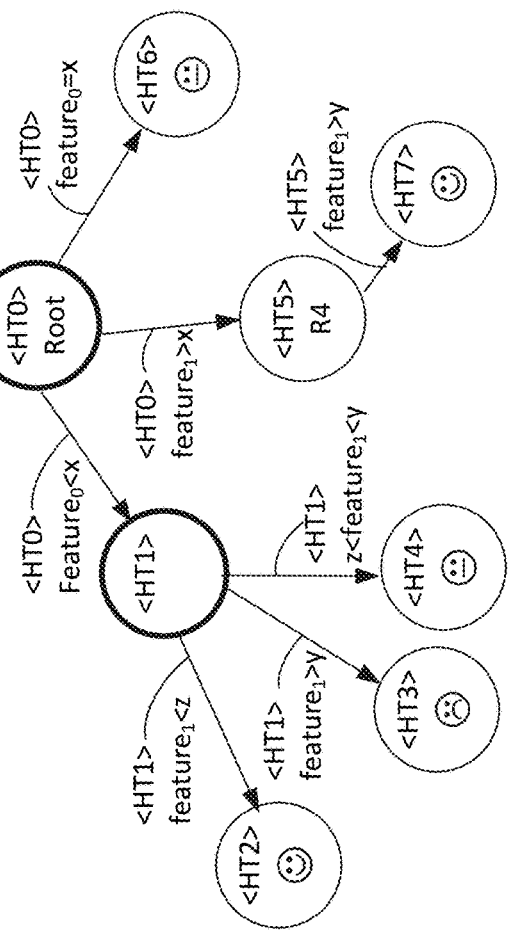
FIGS. 9A-9C are an exemplary input vector, graph memory data, and spatial tree illustration, respectively, that implement a rule set for an input vector having multiple feature-distributed decision trees used for decision making operations for traffic management purposes, according to one or more embodiments.

Referring now to FIGS. 9A-9C, an exemplary input vector 900-C, graph memory data 900-b, and spatial tree illustration 900-A, respectively, are shown that implement a rule set for an input vector having multiple feature-distributed decision trees used for decision making operations for traffic management purposes, according to one or more embodiment Specifically, FIGS. 9A-9C represent a consolidation of a random forest of decision trees run in parallel, with each tree examining certain features or a random subset, say of network traffic as illustrated in the prior figure. The trees for the statistical data shown can generalize the playing field by evaluating them together and with decision-making tools such as weighted-average output, oversampling, etc. The GME apparatus and process described is a powerful tool for machine learning and the broader concept of artificial intelligence, especially, when confronted with multiple different features and with statistical data and unclear patterns.

Running a feature decision tree to classify network traffic helps a data analyst determine a reaction or response while working down to a decision. The user can ask the question whether the data was expected, faulty, shocking, etc. and whether a response is appropriate. Thus, for example, if the root node ID '<HT0>' examines Feature-0 to determine if it was below a threshold of x, as shown in edge '<HT0> Feature-0<x' in tree 900-A, and as shown in graph memory 900-B in row 1, columns A and B, then the state would progress (→) to state '<HT1>' and on feature '<F1>' it would perform an operation of compare, '<cmp>' as shown in graph memory 900-B, row 1, columns D-F, respectively. Depending upon the data and the result operation, an end node (or leaf) might be reached such as node ID '<HT3>', shown as a smiley face for good performance, or node ID '<HT4>' for an average performance, or node '<HT3>' for an unacceptable performance. Thus tree 900-A and respective graph memory 900-B provide a hierarchical decision making process, with weighting and threshold setting to identify and prioritize certain of the multiple different features is more significant.

The specific choice of features and the interpreting and setting of operation types, such as 'compare', and the relationship of the result, such as greater than and less than, and the threshold settings, such as defining values for 'x', 'z', and 'y', is meant for the data analyst and programmer to decide, to accomplish their purpose whether it is customer service, usage models, financial analysis, etc.

EMBODIMENTS

A method of traversing data disposed in a memory for operating a computer, the method comprising: receiving input data to be processed; identifying a next instruction to be fetched in the memory for processing the input data via: receiving a current node ID of a current state; performing a computational test on the input data resulting in a computed value; generating a search key by combining at least a portion of the computed value with the current node ID; and accessing the next instruction in memory via the search key.

Additionally, the next instruction in memory is a next node ID and a next action. Alternatively, the data traversed in memory is a plurality of software instructions for performing at least one of: classification and filtering functions on the input data.

Alternatively, the data traversed in the memory is not required to be stored sequentially; and the memory is associative memory. Alternatively, adding supplemental memory to the memory in order to expand an edge of the associative memory; and wherein: the memory does not require at least one of i) rewriting of data in the memory and ii) duplicating copies of one or more sub graphs.

In another embodiment, the state of the associative memory does not require contiguous multi cycle "lock out" periods to satisfy coherency. In yet another embodiment, receiving external dynamic updates on the fly of at least one of an updated key 211a and an updated value 213a stored in the associative memory; and wherein: the updated key 211a is comprised of at least a portion of an updated computed value and an updated node ID of a given state; and the updated value is comprised of at least a portion of an action and a node ID of a state subsequent to the given state.

Figure 10:
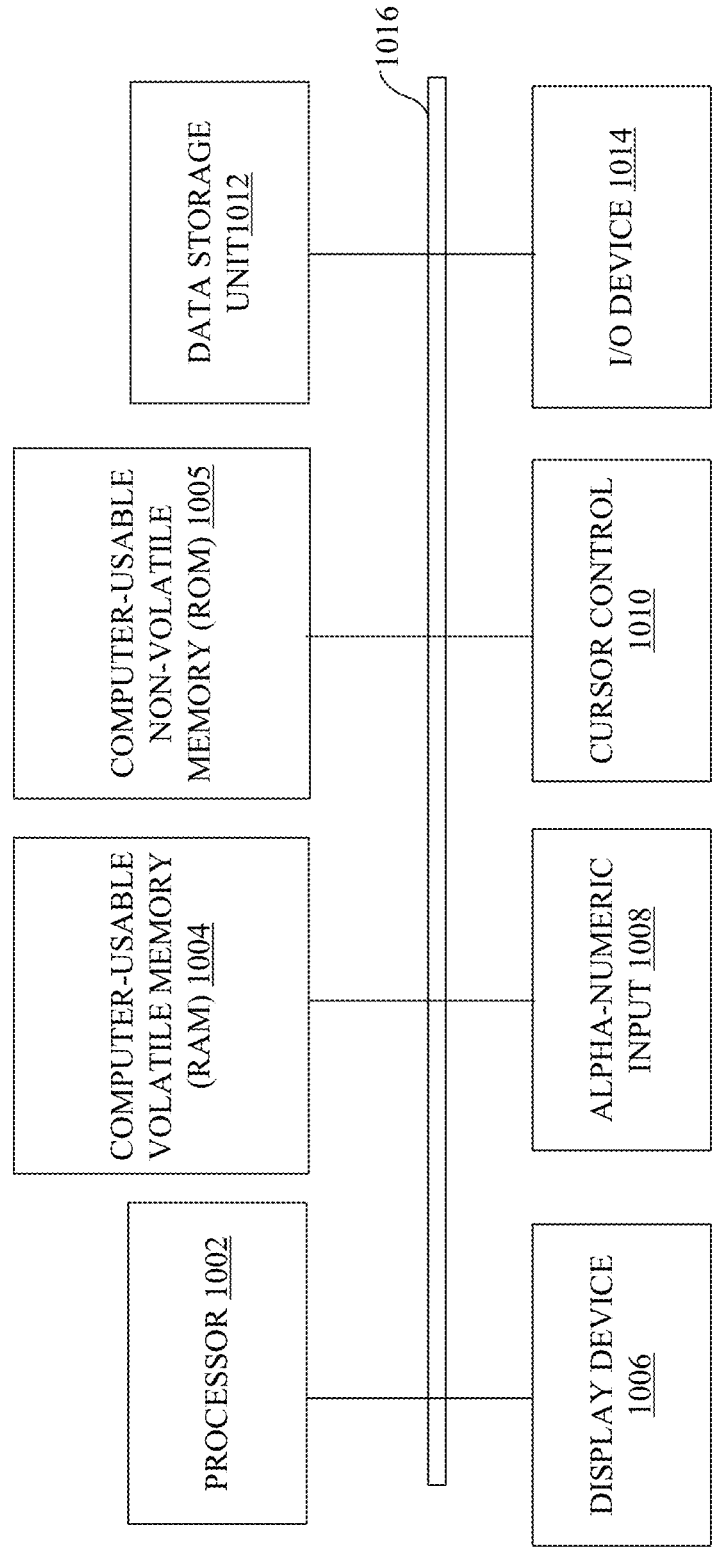
FIG. 10 is a block diagram of a computing device, according to one or more embodiments

In yet another embodiment, the operation of performing a computational test to obtain a computed value further comprises: receiving at least one of i) an action of the current state that was stored in the associative memory and ii) an optional random access memory variable. In another embodiment, creating a memory graph by using the current node ID of the current state, the next node ID of a subsequent state, and the search key used to traverse the associative memory between the current node ID and the next node ID. In another embodiment, traversing from the current node ID to the next node ID for the input data does not require more than one contiguous computation cycle. These operations can be performed recursively in another embodiment.
Computer System:

Referring now to FIG. 10, a representation of a computing device is shown, according to one or more embodiments. Exemplary computing device 1000 includes components and functionality that can be applied to several devices in the GME 200, such as a personal computer of client, a minicomputer, mainframe, server, etc. each of which individually, and all of which in combination, are capable of executing instructions to accomplish the functions and operations described herein. Computing device 900 includes components such as a processor 902 coupled to a memory 904, 905, and/or 912. In particular, processor 902 can be a single or multi-processor core, for processing data and instructions. Memory 904, 905, and/or 912 are used for storing and providing information, data, and instructions, including in particular computer usable volatile memory 904, e.g. random access memory (RAM), and/or computer usable non-volatile memory 905, e.g. read only memory (ROM), and/or a data storage 912, e.g., flash memory, or magnetic or optical disk or drive. Computing device 900 also includes optional inputs, such as an alphanumeric input device 908, e.g., a keyboard or touch screen with alphanumeric, function keys, object driven menus; a keypad button, a microphone with voice recognition software running on a processor, or any device allowing a player to respond to an input; or an optional cursor control device 910, e.g., a roller ball, trackball, mouse, etc., for communicating user input information and command selections to processor 902; or an optional display device 906 coupled to bus for displaying information; and an optional input/output (I/O) device 914 for coupling system with external entities, such as a modem for enabling wired or wireless communications between system and an external network such as the Internet, a local area network (LAN), wide area network (WAN), virtual private network (VPN), etc. Coupling medium 916 of components can be any medium that communicates information, e.g., wired or wireless connections, electrical or optical, parallel or serial bus, etc.

The computing device is only one example of a suitable computing environment and is not intended to suggest any limitation as to the scope of use or functionality of the present technology. Alternatively, clients 902-A through 902-n can be a thin client, e.g., a dumb device, which only has a capability or is only used to a capability of displaying results and accepting inputs. Neither should the computing environment be interpreted as having any dependency or requirement relating to any one or combination of components illustrated in the exemplary computing system. The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices. Overall, the exemplary computing device 1000 is useful to employ the procedure disclosed herein to support or perform memory graph functions.

Figure 11:
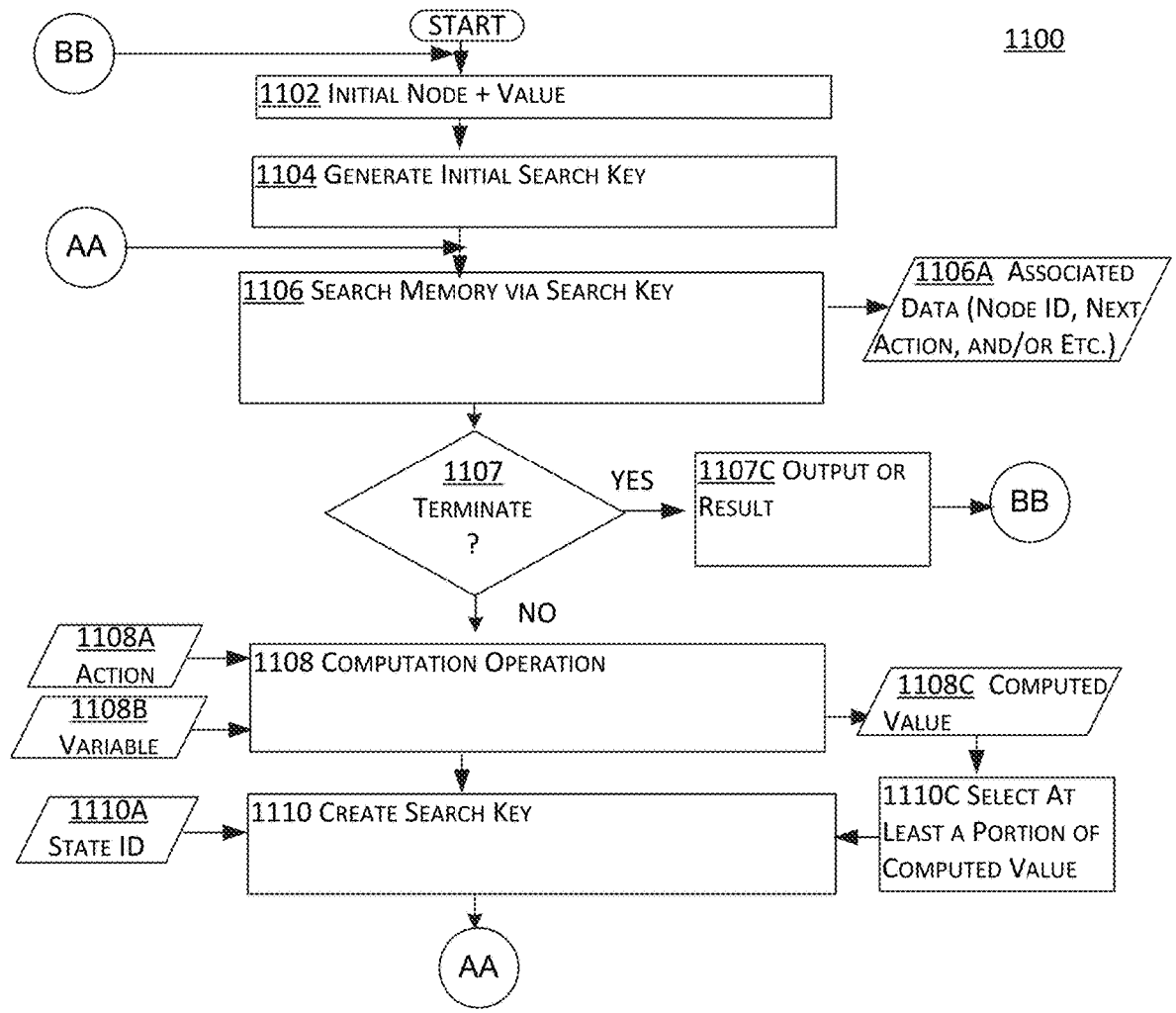
FIG. 11 is a flowchart of a method for traversing associative memory to advance states in a data graph, according to one or more embodiments.

Referring now to FIG. 11, a flowchart 1100 is shown of a method for traversing associative memory to retrieve program instructions and to advance states in a data graph, according to one or more embodiments. Flowchart 1100 is implemented in the prior FIGS. 1A, 1B, 2A, and 2B, and as exemplified in FIGS. 3A-3B, 4, 5A-5C, 6, 7A-7C, 8, 9A-9C, and 10, as described below.

Flowchart 1100 begins with an initial node ID and an initial edge value operation 1102, as shown by input 209 to mux 226 in FIG. 2A. Initial node and edge can begin as muxed into downstream of 230 associative memory in an alternative embodiment, and be read into search key generator 242 via recursive loop 237 and 238. Illustrative FIGS. 3A-3B, 5A-5C, and 7A-7C typically start with an initial node ID of '<HT0>'. Initial edge value input to GME 201-A, with a wide variety of options, ranging from selecting bits, e.g., [0, 24] from input vector in FIG. 3A, to a feature comparison operation of '<F0> x' for input vector per tree 700-A, as shown in FIG. 7A.

Operation 1104 generates a search key by concatenating the initial node ID with the initial edge value. One embodiment generates a search key via search key generator 242 of FIG. 2A, as output 211b from MUX 226.

Operation 1106 searches the associative memory, e.g., 230 FIG. 2A, via the search key. If a match occurs, then output 1106A of associated data is communicated out from associative memory 230, which will help generate a next program instruction. The program instruction includes a next node ID, and optionally an action or test (and optionally, aka, a result or a feature and operation) as shown in FIGS. 3B, 5B, and 7B. The actions, or test are communicated out to a register for node ID 232 to feed back into a next search key, and action is communicated to computation logic 222, optional RAM 236, and/or vector register 240.

Operation 1107 inquires whether the process terminates, e.g., a match with the search key did not exist in the associative memory. If operation 1107 terminates, and a possible output or result 1107C is output from GME 201-A, via vector register 240 as 219 output. If operation does not terminate, then it proceeds to operation 1108.

Computation operation 1108 performs a computation operation for a next edge value, given the action input 1108A from the associative memory, or a variable 1108B from optional RAM 236. Computation operation 1108 has a wide variety of options, ranging from selecting bits, e.g., [0,24] from input vector in FIG. 3A, to a feature comparison operation of '<F0> x' for input vector, as shown in FIG. 7A. Any computation operation can be performed, with an ALU and/or logic disposed in GME 201-A, e.g., in computation logic block 222.

At least a portion of computed value output 1108C is then is input into operation 1110. Operation 1110 generates a next search key. Input 1110A of a next state identifier is also input into computation operation 1108, as received as output from associative memory, via register 232 in recursive loop 237 of FIG. 2A. Both the next state identifier, e.g., node ID in a tree, and a next edge value, are concatenated to form the new search key. The search key is then communicated via AA connector to operation 1106 to search the memory. This is the recursive portion of the process, where a node and instruction are recursively fed back through GME 201-A to generate a next search key, and presumably a next node ID and a next instruction.

Note that through process 1100, memory maintenance may be operated in parallel with discrete memory location updates performed dynamically, or with an expanded supplemental associative memory that expands the graph tree reach.

Pseudocode

The pseudocode implementation for operation 1100 is operable on microprocessor or computation engine, e.g., computing system 1000 shown in FIG. 10 in one embodiment. The pseudocode implementation for operation 1100 is as follows:

```
variables ← initial_values
execute_gme(input_vector, initial_node_id){
    node_id    ← initial_node_id
    edge_value ← initial_edge_value
    done       ← "no"
    while (not done) {
        node_id, action, test, operands ←
        associative_memory(node_id, edge_value)
        output_vector, variables, done ← perform_actions(action,
        operands, variables)
        edge_value ← compute_edge(test, input vector, operands,
        variables)
    }
    return(output_vector)
}
```

The "action" and the "test" may be synonymous in one embodiment. The output vector may have multiple values similar to the input vector and may be built up as a list in a first-in-first-out (FIFO) manner or in a first-in-last-out (LIFO) manner etc. Variables are optional and held in random access memory (RAM). They are initialized at system power on reset time, and they can be used to maintain state across multiple executions of graphs. The pseudocode logic can be converted or adapted to actual program language protocol and syntax for a wide range of applications, as desired by the designer and programmer.

Operations

FIG. 11 is a flowchart illustrating process 1100 for operating a computation engine. The operation is used to traverse associative memory for advancing states in an automata. Process 1100—may be carried out by a circuit or a plurality of circuits. Process 1100 may also have portions offloaded to a computer system. In one embodiment, process 1100 is carried out by processors, micro-controllers, memory controllers, logic circuits, and/or electrical components under the control of computer readable and computer executable instructions stored on a non-transitory computer-usable storage medium. In one embodiment, process 1100 is performed by the devices, components, and illustrations in FIGS. 1A, 1B, 2A, 2B, 3A, 3B, 5A, 5B, 7A, 7B, 9A, 9B, 10, and 11.

The above advantages are exemplary, and these or other advantages may be achieved by the invention. Further, the skilled person will appreciate that not all advantages stated above are necessarily achieved by embodiments described herein.

In the foregoing specification, the invention has been described with reference to specific examples of embodiments of the invention. It will be evident, however, that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. In addition, plurality of connections may be replaced with a single connection that transfers multiple signals serially or in a time-multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above-described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner, such as components packaged together in a module, or as components on board or a card. For example, processing in relation to different groups of profiles may be allocated to respective different integrated circuits.

Additionally, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, for example a Field Programmable Gate Array (FPGA).

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as "one, or more than one." Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are arbitrarily used to distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

As used throughout this application, the word "may" is used in a permissive sense (i.e., meaning having the potential to), rather than the mandatory sense (i.e., meaning must). Similarly, the words "include," "including," and "includes" mean "including, but not limited to" the listed item(s).

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six, interpretation for that unit/circuit/component.

Unless specifically stated otherwise as apparent from the foregoing discussions, it is appreciated that throughout the present description of embodiments, discussions utilizing terms such as "storing," "operating", "accessing," "associating," "generating,", "receiving," "performing," "matching," "retrieving," "outputting," "adding," "executing," or the like, refer to the actions and processes of an integrated circuit, an ASIC, a memory device, a computer system, or similar electronic computing device. The memory device or similar electronic computing device manipulates and transforms data represented as physical (electronic) quantities within the devices' registers and memories into other data similarly represented as physical quantities within the devices' memories or registers or other such information storage, transmission, or display devices.

I claim:

1. A method of operating a computation engine, the method comprising:
storing instructions in a memory;
operating the memory as an associative memory, wherein the memory comprises a content addressable memory (CAM) and wherein the instructions are identified by nodes of a tree of a memory graph; and
performing the instructions by the computation engine:
executing a first instruction of the instructions that is identified by a first node;
based on the first node comprising a branch to multiple nodes and based on the memory graph identifying a second node of the multiple nodes as a next branch node, selecting the second node of the multiple nodes as the next branch node;
based on the first node comprising the branch to multiple nodes and the memory graph identifying a third node of the multiple nodes as the next branch node, selecting the third node of the multiple nodes as the next branch node; and
executing a second instruction of the instructions identified by the next branch node.

2. The method of claim 1 further comprising:
accessing the instructions from the memory independent of a program pointer input to the memory.

3. The method of claim 1 wherein:
the computation engine is to operate as at least one of: a Turing machine, a Turing-equivalent machine, or a Turing-complete machine.

4. The method of claim 1 further comprising:
accessing at least one of the instructions from the memory using a search key.

5. The method of claim 1 further comprising:
storing the instructions in the associative memory; and
associating a given instruction in the associative memory with a state identifier, wherein:
the given instruction comprises at least one of a next state identifier, an action, or a test.

6. The method of claim 1 wherein:
the memory does not access an input referencing an index for the storing instructions in the memory or accessing operations of the instructions.

7. The method of claim 1 further comprising:
associating, in the memory, a state identifier with an edge value for each edge of a given state.

8. The method of claim 1 further comprising:
generating a search key to traverse the memory and locate a next state; and
the search key is based on a concatenation of a current state identifier with an edge value.

9. The method of claim 1 further comprising:
receiving an input data;
performing a computational operation on the input data to create a computed value; and
generating a search key from at least a portion of the computed value.

10. The method of claim 9 further comprising:
processing of the input data by one contiguous computation cycle.

11. The method of claim 4 further comprising:
matching the search key to a state identifier and an edge value disposed in the memory; and
retrieving data from the memory that is associated with the state identifier and the edge value stored in the memory.

12. The method of claim 1 further comprising:
outputting from the memory, an instruction associated with at least a current state identifier that matched a search key, wherein:
the instruction outputted from the memory includes at least one of: a next node ID, an action and/or a test;
the instruction instructs at least a computation element to generate at least a portion of a new search key; and
a next state identifier comprises at least the next node ID.

13. The method of claim 1 wherein:
the instructions stored in the memory to be traversed comprise software program instructions for performing at least one of: a classification function or a filtering function.

14. The method of claim 1 wherein:
the instructions disposed in the memory are not required to be stored sequentially and a sequence of execution of the instructions is based on a sequence of values, stored in the memory, indicative of a subsequent instruction to execute.

15. The method of claim 1 further comprising:
adding a supplemental memory to the memory in order to expand an edge of the associative memory, wherein:
the supplemental memory is operated as an associative memory.

16. The method of claim 1 wherein:
a state of the memory is independent from contiguous multi cycle lockout periods to satisfy coherency.

17. The method of claim 1 further comprising:
receiving dynamic updates to create at least one of i) an updated key, or ii) an updated associated data stored in the memory, wherein:
the updated associated data comprises at least one of i) an action, a test, and/or ii) a node ID of a state subsequent to a given state.

18. The method of claim 9 wherein:
the computational operation to obtain a computed value further comprises:
receiving at least one of i) a next action stored in the associative memory or ii) an optional variable from a random access memory.

19. The method of claim 1 further comprising:
traversing a memory graph in the memory via operations of:
matching a search key to at least one of a current state identifier and an edge value stored in the memory; and
executing an instruction output from the memory that was associated with the at least one of the current state identifier and the edge value that matched the search key.

20. The method of claim 18 further comprising:
creating a next search key using at least one of a next state identifier and the computed value obtained from an executed instruction that was output from the memory.

21. An apparatus for processing instructions, the apparatus comprising:
a computation engine and
a memory coupled to the computation engine, wherein:
the memory comprises a content addressable memory (CAM);
the memory is to store instructions for execution by the computation engine;
the memory is operated as an associative memory;
the instructions are identified by nodes of a tree of a memory graph; and
the computation engine is to execute the instructions by traversal of the nodes of the tree by:
execution of a first instruction of the instructions that is identified by a first node,
based on the first node comprising a branch to multiple nodes and based on the memory graph identifying a second node of the multiple nodes as a next branch node, selection of the second node of the multiple nodes as the next branch node,
based on the first node comprising the branch to multiple nodes and the memory graph identifying a third node of the multiple nodes as the next branch node, selection of the third node of the multiple nodes as the next branch node, and
execution of a second instruction of the instructions identified by the next branch node.

22. The apparatus of claim 21 wherein:
the computation engine and the memory are configured to:
access the instructions in the memory independent of a program pointer input to the memory.

23. The apparatus of claim 21 wherein:
the computation engine is classifiable as at least one of: a Turing machine, a Turing-equivalent machine, or a Turing-complete machine.

24. The apparatus of claim 21 further comprising:
a search key generator coupled to the memory; and wherein:
the search key generator is to generate a search key based on a concatenation of at least one of a current state identifier and at least a portion of a computed value.

25. The apparatus of claim 21 wherein:
the computation engine and the memory are configured to:
store the instructions in the memory; and
associate the instructions in the memory with at least one of a state identifier or an edge value.

26. The apparatus of claim 21 wherein:
the computation engine and memory are configured to:
access the instructions in the memory independent of an input referencing an index.

27. The apparatus of claim 21 wherein:
the memory is to associate an edge value for a given state with a state identifier.

28. The apparatus of claim 24 further comprising:
the search key generator is coupled to: i) the computation engine to receive a computed value; and ii) an output from the memory to receive a next instruction; and iii) an input to the memory to receive a next search key.

29. The apparatus of claim 21 further comprising:
a second memory coupled to i) the memory to receive an instruction; and ii) the computation engine is to input a stored data to be used for computing a value for a next search key.

30. The apparatus of claim 21 further comprising:
at least one of the computation engine, a search key generator, and a second memory to execute one or more recursive loops in order to: i) execute at least one of an instruction for a given state, and ii) traverse states in the memory.

* * * * *